US012491441B2

(12) United States Patent
Ishizuka et al.

(10) Patent No.: US 12,491,441 B2
(45) Date of Patent: Dec. 9, 2025

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Ryohei Ishizuka, Tokyo (JP); Kosuke Higo, Tokyo (JP); Tomohiro Yasuda, Tokyo (JP); Kazumi Izawa, Tokyo (JP)

(73) Assignee: CYGAMES, INC., Tokyo (JP)

( * ) Notice: Subject to any disclaimer, the term of this patent is extended or adjusted under 35 U.S.C. 154(b) by 326 days.

(21) Appl. No.: 18/188,948

(22) Filed: Mar. 23, 2023

(65) Prior Publication Data

US 2023/0226447 A1 Jul. 20, 2023

Related U.S. Application Data

(63) Continuation of application No. PCT/JP2021/034978, filed on Sep. 24, 2021.

(30) Foreign Application Priority Data

Sep. 24, 2020 (JP) ................................ 2020-160082

(51) Int. Cl.
*A63F 13/58* (2014.01)
*A63F 13/69* (2014.01)

(52) U.S. Cl.
CPC .............. *A63F 13/58* (2014.09); *A63F 13/69* (2014.09)

(58) Field of Classification Search
CPC ........................................................ A63F 13/69
See application file for complete search history.

(56) References Cited

U.S. PATENT DOCUMENTS 11,752,439 B2 * 9/2023 Fan ........................ A63F 13/837 463/5
11,801,448 B1 * 10/2023 Zatkin ................... A63F 13/792
(Continued)

FOREIGN PATENT DOCUMENTS

JP 6501317 B2 4/2019
JP 2019-155168 A 9/2019

OTHER PUBLICATIONS

Ali-A, "*New Season 5—Tier 100 Skin (Unlocked)—Fortnite: Battle Royale!," Jul. 12, 2018, available at https://www.youtube.com/watch?v=3QFM6rhR_dU&t=5s (Year: 2018).*
(Continued)

*Primary Examiner* — Jay Trent Liddle
(74) *Attorney, Agent, or Firm* — Osha Bergman Watanabe & Burton LLP

(57) ABSTRACT

A non-transitory computer-readable medium stores a program causing a computer to execute: registering a game object selected by each player, each player selecting the game object from a plurality of types of game objects, the game object being registered as a participating object serving as an operable target in a first game; setting a special object for the first game; changing the operable target to the special object, irrespective of the type of the participating object, for a player satisfying a prescribed condition in the first game; executing the first game by using common status information that is common at least to the participating objects of the same type when a player uses the participating object as the operable object; and executing the first game by using special status information set for the special object when a player uses the special object as the operable object.

6 Claims, 29 Drawing Sheets

(56) References Cited

U.S. PATENT DOCUMENTS

| | | | | |
|---|---|---|---|---|
| 2007/0238499 | A1* | 10/2007 | Wright | A63F 13/12 463/1 |
| 2012/0088586 | A1* | 4/2012 | Watkins, Jr. | A63F 13/69 463/42 |
| 2014/0038719 | A1* | 2/2014 | Kobayashi | A63F 13/69 463/40 |
| 2015/0174494 | A1* | 6/2015 | Yamaguchi | A63F 13/58 463/43 |
| 2015/0190715 | A1* | 7/2015 | Yamaguchi | A63F 13/69 463/43 |
| 2016/0124518 | A1* | 5/2016 | Takahashi | G06F 3/04817 463/31 |
| 2019/0279452 | A1* | 9/2019 | Yamamoto | A63F 13/71 |

OTHER PUBLICATIONS

GamingKnight. "Fortnite Golf Cart Gameplay Season 5," Jul. 12, 2018, available at https://www.youtube.com/watch?v=FHPsjiAUYH0 (Year: 2018).*

International Search Report issued in PCT/JP2021/034978 on Dec. 7, 2021 (4 pages).

Written Opinion of the International Searching Authority issued in PCT/JP2021/034978 on Dec. 7, 2021 (4 pages).

Office Action issued in the counterpart Japanese Patent Application No. 2020-160082, mailed on Mar. 9, 2021 (10 pages).

[BF5] How to play and operate Battle Royale "Firestorm" for beginners. How to use ammo items and armor plates of weapon, May 1, 2019, [retrieval date Feb. 24, 2021], <https://arutora.com/19007> (16 pages).

What is Fortnite? Beginner's Guide, Sep. 2, 2020, [retrieval date Feb. 17, 2021], <https://www.epicgames.com/fortnite/ja/news/whatis-fortnite-begginers-guide> (10 pages).

List of all vehicles and explanation of simple features, May 16, 2019, [retrieval date Feb. 17, 2021], <https://gamewith.jp/fortnite/article/show/150803> (9 pages).

Let's review Bomberman in preparation for the eQ league. Perfect Oshijin founder, Mar. 10, 2019 [retrieval date Feb. 24, 2021], <https://satookaf.hatenablog.com/entry/2019/03/10/133648> (16 pages).

[BF5] Impression evaluation of Battlefield 5 by beginners. Summarize the recommended points, Feb. 9, 2019 [retrieval date Feb. 24, 2021], <https://msy-travel.com/2019/02/09[bf5]>(19 pages).

Progress system of "Battle Field V", Nov. 28, 2018 [retrieval date Feb. 17, 2021], <https://help.ea.com/ja-ip/battlefield/battlefield-vprogression/> (5 pages).

[Battlefield V] Recommendation and impression evaluation of the latest Battle Royale mode [Firesotrm], Mar. 31, 2019 [retrieval date Feb. 24, 2021], <https//msytravel.com/2019/03/31/> (20 pages).

* cited by examiner

| WEAPON TYPE | ATTACKING ABILITY | HP | BURST | MOVING SPEED [km/h] | ATTACKING SPEED [s] | RANGE [m] | SKILL ACCUMULATION PERIOD [s] | SKILL |
|---|---|---|---|---|---|---|---|---|
| SWORD | 80 | 2400 | 160 | 14 | 0.3 | 2 | 12 | ATTACK |
| SPEAR | 60 | 2800 | 160 | 14 | 0.3 | 3 | 14 | INCREASE ATTACKING ABILITY |
| BLADE | 80 | 2800 | 180 | 12 | 0.2 | 3 | 16 | TEMPORARILY DISAPPEAR |
| AXE | 100 | 2800 | 160 | 10 | 0.1 | 2 | 14 | INCREASE DEFENDING ABILITY |
| KNIFE | 40 | 2400 | 160 | 16 | 0.5 | 2 | 12 | INCREASE MOVING SPEED |
| ROD | 80 | 2200 | 160 | 14 | 0.2 | 5 | 10 | ATTACK AND INCREASE MOTIVATION |
| WAND | 80 | 2400 | 180 | 12 | 0.2 | 5 | 14 | RECOVER HPs |
| BOW | 80 | 2400 | 200 | 14 | 0.5 | 5 | 14 | INCREASE SPEED FOR BURST |
| GUN | 85 | 2400 | 180 | 12 | 0.5 | 10 | 14 | SHORT-RANGE ATTACK |

FIG.18A

| DRAGON TYPE | ATTACKING ABILITY | MOVING SPEED [km/h] | ATTACKING SPEED [s] | RANGE [m] |
|---|---|---|---|---|
| DRAGON A | 400 | 14 | 80 | 10 |
| DRAGON B | 350 | 14 | 80 | 12 |
| DRAGON C | 400 | 12 | 70 | 12 |
| DRAGON D | 450 | 10 | 60 | 8 |

FIG.18B

| TOTAL ACQUIRED WEAPON POINTS | WEAPON LEVEL |
|---|---|
| 0 | 1 |
| 1 | 2 |
| 4 | 3 |
| 9 | 4 |
| 19 | 5 |

FIG.18C

| WEAPON LEVEL | ATTACKING ABILITY |
|---|---|
| 1 | – |
| 2 | +10% |
| 3 | +15% |
| 4 | +20% |
| 5 | +30% |

FIG.18D

| ROOM NO. | STATUS |
|---|---|
| 1000 | DURING MATCHING |
| 1001 | DURING BATTLE GAME |
| 1002 | DURING BATTLE GAME |
| 1003 | DURING COUNT-DOWN |
| 1004 | VACANT |
| 1005 | VACANT |
| 1006 | VACANT |
| 1007 | VACANT |
| 1008 | VACANT |
| 1009 | VACANT |
| ⋮ | ⋮ |

FIG.21

| ROOM NO. 1000 | | | | |
|---|---|---|---|---|
| PLAYER NO. | PLAYER NAME | PLAYER ID | INITIAL POSITION | ROOM ENTRY TIME |
| 1 | sword | 10001 | X1 | 12:11:00 |
| 2 | Rafael | 71001 | X2 | 12:11:01 |
| 3 | Olesya | 52112 | X3 | 12:11:01 |
| 4 | Aurora | 23110 | X4 | 12:11:02 |
| 5 | Barbro | 82000 | X5 | 12:11:03 |
| 6 | wizard | 10101 | X6 | 12:11:05 |
| 7 | Maurizia | 38201 | X7 | 12:11:05 |
| 8 | Milton | 15200 | X8 | 12:11:07 |
| 9 | Sergio | 44257 | X9 | 12:11:10 |
| 10 | Adolf | 65738 | X10 | 12:11:15 |
| 11 | Diamond | 18524 | X11 | 12:11:20 |
| 12 | Fernand | 25763 | X12 | 12:11:22 |
| 13 | Daniel | 38576 | X13 | 12:11:23 |
| 14 | Ondrej | 57354 | X14 | 12:11:25 |
| 15 | Volker | 52486 | X15 | 12:11:28 |
| 16 | Ginette | 96453 | X16 | 12:11:29 |

FIG.22A

| ROOM NO. 1000 | | | | |
|---|---|---|---|---|
| PLAYER NO. | PLAYER NAME | PLAYER ID | INITIAL POSITION | ROOM ENTRY TIME |
| 1 | sword | 10001 | X1 | 12:11:00 |
| 2 | Rafael | 71001 | X2 | 12:11:04 |
| 3 | Olesya | 52112 | X3 | 12:11:10 |
| 4 | Aurora | 23110 | X4 | 12:11:12 |
| 5 | Barbro | 82000 | X5 | 12:11:15 |
| 6 | wizard | 10101 | X6 | 12:11:20 |
| 7 | Maurizia | 38201 | X7 | 12:11:22 |
| 8 | Milton | 15200 | X8 | 12:11:23 |
| 9 | Sergio | 44257 | X9 | 12:11:25 |
| 10 | Euden | (NPC) | X10 | - |
| 11 | Euden | (NPC) | X11 | - |
| 12 | Euden | (NPC) | X12 | - |
| 13 | Euden | (NPC) | X13 | - |
| 14 | Euden | (NPC) | X14 | - |
| 15 | Euden | (NPC) | X15 | - |
| 16 | Euden | (NPC) | X16 | - |

FIG.22B

| LOTTERY SITE SERVER | DRAGON A | DRAGON B | DRAGON C | DRAGON D |
|---|---|---|---|---|
| DRAGON TYPE | 25 | 50 | 75 | 100 |

FIG.23A

| LOTTERY SITE SERVER | PATTERN 1 | PATTERN 2 | PATTERN 3 | PATTERN 4 | PATTERN 5 | PATTERN 6 | PATTERN 7 | PATTERN 8 |
|---|---|---|---|---|---|---|---|---|
| CONTENT OF FIELD | 20 | 40 | 20 | 40 | 20 | 40 | 20 | 50 |

FIG.23B

| LOTTERY SITE SERVER | PATTERN 1 | PATTERN 2 | PATTERN 3 | PATTERN 4 | PATTERN 5 | PATTERN 6 | PATTERN 7 | PATTERN 8 |
|---|---|---|---|---|---|---|---|---|
| CONTENT OF MIASMA-RANGE CHANGE PATTERN | 20 | 40 | 20 | 40 | 20 | 40 | 20 | 50 |

FIG.23C

| LOTTERY SITE HOST | WEAPON ENHANCEMENT 1 | WEAPON ENHANCEMENT 2 | WEAPON ENHANCEMENT 3 | ... | RECOVERY 1 | RECOVERY 2 | SKILL 1 | SKILL 2 | SKILL 3 |
|---|---|---|---|---|---|---|---|---|---|
| CONTENT OF INITIAL ITEM | 20 | 10 | 5 | ... | 15 | 10 | 25 | 20 | 15 |

FIG.23D

| LOTTERY-SITE DEFEATING PLAYER | WEAPON ENHANCEMENT 1 | WEAPON ENHANCEMENT 2 | WEAPON ENHANCEMENT 3 | SKILL 1 | SKILL 2 | SKILL 3 |
|---|---|---|---|---|---|---|
| CONTENT OF DROPPED ITEM | 100 | 60 | 30 | 25 | 20 | 15 |

FIG.23E

FIG.24
PLAYER TERMINAL
SERVER
LOG-IN OPERATION
P1
OUTPUT LOG-IN INFORMATION
LOG-IN INFORMATION
S1
SET PLAYER INFORMATION
PLAYER INFORMATION
P2
STORE PLAYER INFORMATION
CHARACTER-SKIN SETTING OPERATION
P3
UPDATE CHARACTER SKIN
CHARACTER-SKIN UPDATE INFORMATION
S2
UPDATE PLAYER INFORMATION
WEAPON-SKIN SETTING OPERATION
P4
UPDATE WEAPON SKIN
WEAPON-SKIN UPDATE INFORMATION
S3
UPDATE PLAYER INFORMATION
PURCHASE OPERATION
P5
ACQUIRE CHARACTER SKIN
POSSESSED-SKIN UPDATE INFORMATION
S4
UPDATE PLAYER INFORMATION
BATTLE SELECTION OPERATION
P6
BATTLE-ROYALE PRE-START PROCESS
MATCHING REQUEST INFORMATION
P7
TERMINAL-SIDE MATCHING PROCESSING
S5
SERVER-SIDE MATCHING PROCESSING
P8
S6
MATCHING COMPLETION PROCESS
P9
S7
BATTLE-ROYALE EXECUTION PROCESS

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2021/034978, filed on Sep. 24, 2021, which claims priority to Japanese Patent Application No. 2020-160082, filed on Sep. 24, 2020, the entire contents of which are incorporated by reference herein.

BACKGROUND ART

Technical Field

The present invention relates to information processing programs, information processing methods, and information processing systems.

Games in which battles against enemy characters are played have hitherto been known, as disclosed in Patent Literature 1. In such games, by equipping characters with various items, it becomes possible for a player to advantageously proceed with the games.

Furthermore, Patent Literature 2 discloses a game in which an additional card is combined with a base card that provides a prescribed effect, whereby the effect is enhanced.

CITATION LIST

Patent Literature

Patent Literature 1: JP 2019-155168 A
Patent Literature 1: JP 6501317 B

SUMMARY OF INVENTION

Technical Problem

With the games mentioned above, the proceedings of the games depend on whether or not strong items or cards are possessed. As a result, the status of characters that are used in the games considerably varies between experienced players and novice players, which might compromise the fun of the games.

It is an object of the present invention to provide an information processing program, an information processing method, and an information processing system that make it possible to enhance the fun of a game.

Solution to Problem

In order to solve the problem described above, an information processing program causes a computer to function as: a participation registration unit that registers game objects in association with a plurality of players as participating objects that serve as operable targets in prescribed games, the game objects being selected by the individual players from among a plurality of types of game objects; a setting unit that sets special objects for each of the prescribed games; an operable-target setting unit that sets the participating objects as operable targets and that changes the operable targets to the special objects, irrespective of the types of the participating objects, for players for whom a prescribed condition is satisfied in the prescribed game; and a prescribed-game execution unit that executes the prescribed game by using common status information that is common at least to the participating objects of the same type in the case where the participating objects are set as operable targets, and that executes the prescribed game by using special status information that is common to one of the special objects in the case where the special objects are set as operable targets.

The program may cause the computer to function as: a management unit that stores, as a prescribed-game object, the game object for which a prescribed usage condition for use by the player is satisfied in the prescribed game, and that stores, as a specific-game object, the game object for which a specific usage condition that is different from the prescribed usage condition is satisfied in a specific game that is different from the prescribed game; a changing unit that changes the status of the specific-game object in the specific game in accordance with a specific condition; and a specific-game execution unit that executes the specific game with reference to the status of the specific-game object, changed by the changing unit, it may be possible to use a common image in the prescribed game and the specific game, and it may be possible to use a common image for the prescribed-game object and the specific-game object.

In order to solve the problem described above, an information processing method includes: a step of registering game objects in association with a plurality of players as participating objects that serve as operable targets in prescribed games, the game objects being selected by the individual players from among a plurality of types of game objects; a step of setting special objects for each of the prescribed games; a step of setting the participating objects as operable targets and changing the operable targets to the special objects, irrespective of the types of the participating objects, for players for whom a prescribed condition is satisfied in the prescribed game; and a step of executing the prescribed game by using common status information that is common at least to the participating objects of the same type in the case where the participating objects are set as operable targets, and executing the prescribed game by using special status information that is common to one of the special objects in the case where the special objects are set as operable targets.

In order to solve the problem described above, an information processing system includes: a participation registration unit that registers game objects in association with a plurality of players as participating objects that serve as operable targets in prescribed games, the game objects being selected by the individual players from among a plurality of types of game objects; a setting unit that sets special objects for each of the prescribed games; an operable-target setting unit that sets the participating objects as operable targets and that changes the operable targets to the special objects, irrespective of the types of the participating objects, for players for whom a prescribed condition is satisfied in the prescribed game; and a prescribed-game execution unit that executes the prescribed game by using common status information that is common at least to the participating objects of the same type in the case where the participating objects are set as operable targets, and that executes the prescribed game by using special status information that is common to one of the special objects in the case where the special objects are set as operable targets.

Effects of Disclosure

The present invention makes it possible to enhance the fun of a game.

BRIEF DESCRIPTION OF DRAWINGS

FIG. 18A is a figure for explaining a weapon-type status table.

FIG. 18B is a figure for explaining a dragon status table.

FIG. 18C is a figure for explaining a weapon point table.

FIG. 18D is a figure for explaining a weapon level table.

FIG. 21 is a figure for explaining an example matching-room status table.

FIGS. 22A and 22B are figures for explaining example player management tables.

FIG. 23A is a figure for explaining a dragon-type lottery table.

FIG. 23B is a figure for explaining an example field content lottery table

FIG. 23C is a figure for explaining an example miasma-range change-pattern content lottery table.

FIG. 23D is a figure for explaining an example initial-item content lottery table.

FIG. 23E is a figure for explaining an example dropped-item content lottery table.

DESCRIPTION OF EMBODIMENTS

An aspect of an embodiment of the present invention will be described below in detail with reference to the accompanying drawings. The numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
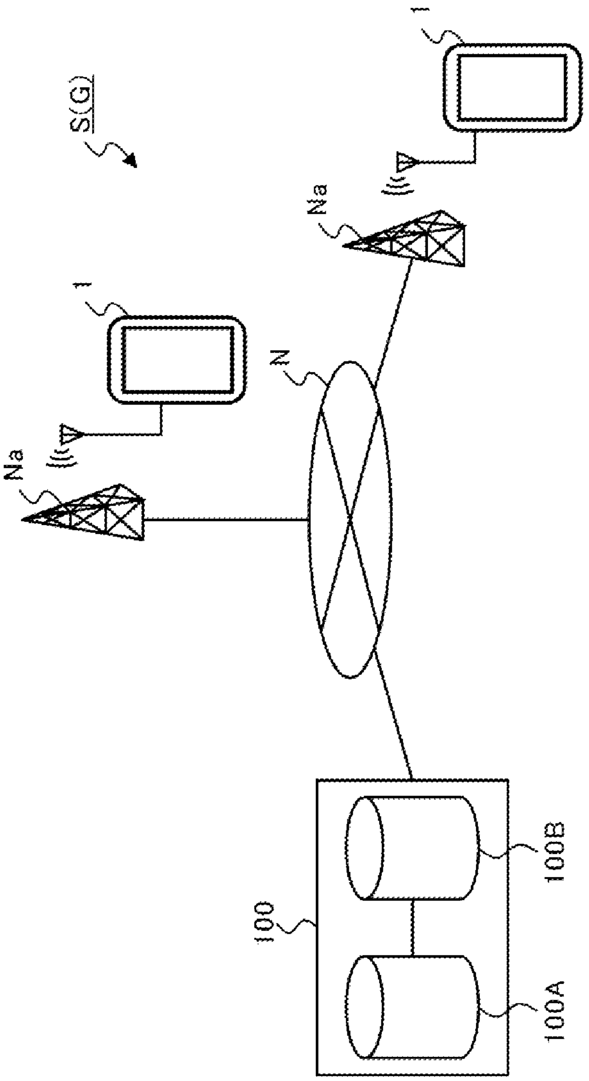
FIG. 1 is an explanatory illustration schematically showing the configuration of an information processing system.

FIG. 1 is an explanatory illustration schematically showing the configuration of an information processing system S. The information processing system S is what is called a client-server system including player terminals 1 (game terminals), a server 100, and a communication network N having communication base stations Na.

In the information processing system S in this embodiment, the player terminals 1 and the server 100 function as game devices G. The player terminals 1 and the server 100 individually share roles for controlling the proceeding of a game, and it becomes possible to proceed with the game through cooperation between the player terminals 1 and the server 100.

The player terminals 1 can establish communication with the server 100 via the communication network N. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 includes a management server 100A and a battle game server 100B. The management server 100A accumulates various kinds of information (player information) for each player who plays the game. Furthermore, the management server 100A mainly carries out processing such as updating the accumulated information and allowing the player terminals 1 to download images and various kinds of information, on the basis of operations input from the player terminals 1.

Furthermore, the information processing system S realizes a battle game in which a plurality of players cooperatively play battles against enemy characters. Furthermore, the information processing system S realizes a battle game in the form of what is called a battle royale, in which a plurality of players, or a plurality of players and non-player characters (hereinafter referred to as NPCs) in the case where the number of players is insufficient, play battles against each other. The battle game server 100B mainly carries out processing for controlling the proceeding of a battle game, such as creating a room for carrying out the battle game, assigning players to the room, sending information to and receiving information from a plurality of player terminals 1 connected to the room, and synchronizing the plurality of player terminals 1.

Hereinafter, of the games provided by the information processing system S, battle games will be referred to as in-games, and games other than battle games will be referred to as out-games. The management server 100A mainly carries out processing relating to out-games, and the battle game server 100B mainly carries out processing relating to in-games.

The communication base stations Na are connected to the communication network N and send information to and receive information from the player terminals 1 in a wireless manner. The communication network N is implemented by a mobile phone network, an Internet network, a local area network (LAN), a special circuit, or the like, and realizes wireless or wired communicative connection between the player terminals 1 and the server 100.

(Hardware Configurations of Player Terminals 1 and Server 100)

Figure 2A:
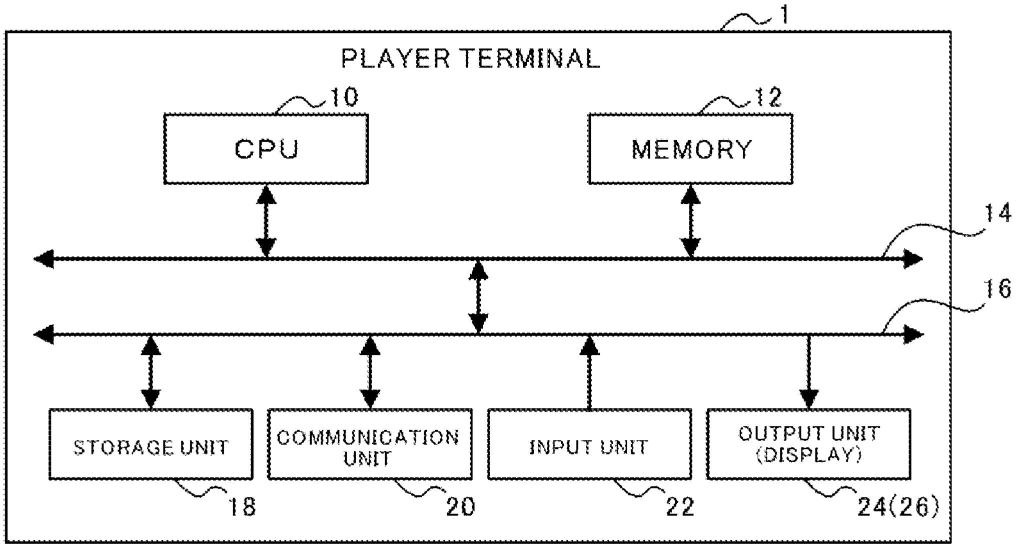
FIG. 2A is an illustration for explaining the hardware configuration of a player terminal.
Figure 2B:
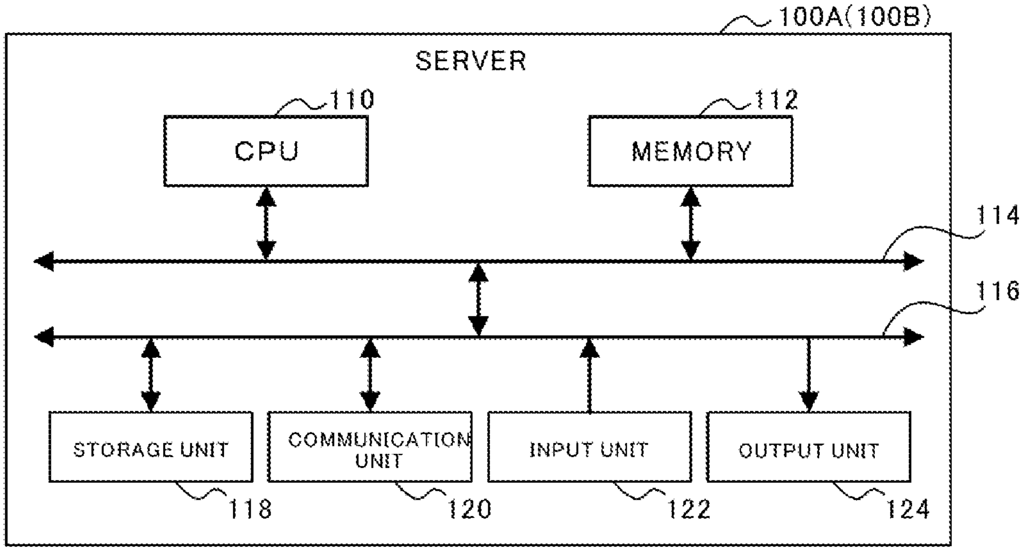
FIG. 2B is an illustration for explaining the hardware configuration of a server.

FIG. 2A is a diagram for explaining the hardware configuration of a player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the management server 100A and the battle game server 100B are configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the management server 100A and the battle game server 100B are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting descriptions of the management server 100A and the battle game server 100B.

The CPU 10 runs a program stored in the memory 12 to control the proceeding of the game. The memory 12 is configured of a read only memory (ROM) or a random access memory (RAM), and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to a communication base station Na in a wireless manner, and sends information to and receives information from the server 100 via the communication network N, such as various kinds of data and programs. In the player terminal 1, programs, etc. received from the server 100 are stored in the memory 12 or the storage unit 18.

The input unit 22 is configured of a unit via which player operations are input (operations are accepted), such as a touch panel, buttons, a keyboard, a mouse, a cross keypad, or an analog controller. Alternatively, the input unit 22 may be a special controller provided at the player terminal 1 or connected (externally) to the player terminal 1. Alternatively, the input unit 22 may be configured of an acceleration sensor that detects tilting or movement of the player terminal 1 or a microphone that detects player's voice. That is, examples of the input unit 22 include a wide range of devices that enable the input of player's intents in distinguishable manners.

The output unit 24 is configured to include a display device and a speaker. Note that the output unit 24 may be a device connected (externally) to the player terminal 1. In this embodiment, the player terminal 1 includes a display 26 as the output unit 24 and includes a touch panel as the input unit 22, the touch panel being provided so as to be stacked on the display 26.

(Game Specifics)

Next, the specifics of the games provided by the information processing system S (game devices G) in this embodiment will be described in the context of an example. In this embodiment, specific games (quests) and prescribed games (battle royales) are provided. In the specific games, the player can own characters acquired through lotteries, called gacha, as well as characters distributed from the administrator side. The player can form a party by selecting a plurality of (four here) characters from the characters owned by the player (hereinafter referred to as owned characters). The player can play battle games in which the player plays battles against enemy characters by using the party formed.

Figure 3A:
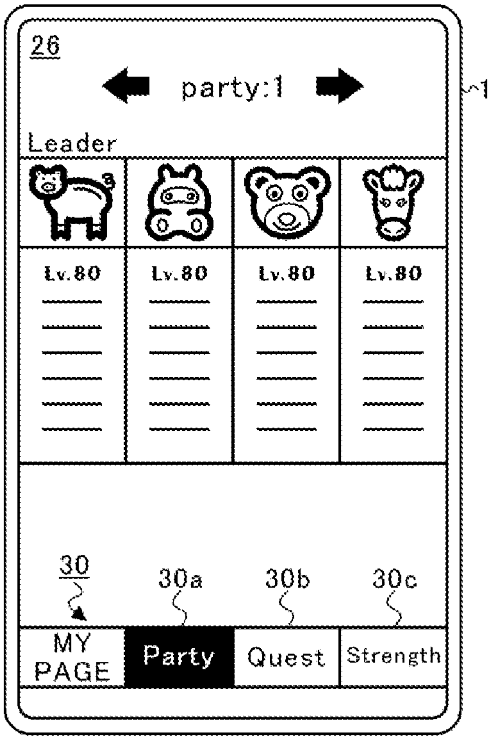
FIGS. 3A and 3B are illustrations for explaining example party formation screens in a specific game.
Figure 3B:
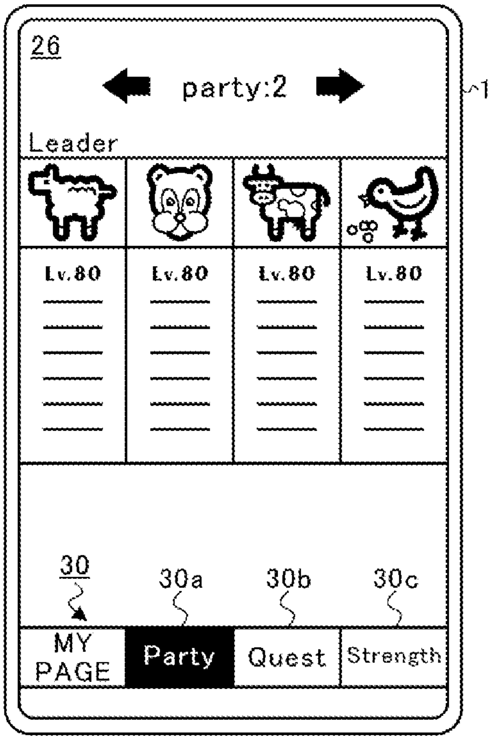

FIGS. 3A and 3B are illustrations for explaining example party formation screens in a specific game. During an out-game, a menu bar 30 is displayed in a lower part of the display 26. In the menu bar 30, a plurality of selecting parts, including a party-formation selecting part 30*a*, a quest selecting part 30*b*, and an enhancement selecting part 30*c*, are provided. When the party-formation selecting part 30*a* is tapped, a party formation screen is displayed, as shown in FIG. 3A. In the party formation screen, party information concerning a party formed by the player is displayed.

The player registers a party by selecting four owned characters. In the party formation screen, information concerning the characters constituting the registered party (hereinafter referred to as party forming characters) is displayed as arrayed side by side. Specifically, the player can register four owned characters in a party as a first party forming character, a second party forming character, a third party forming character, and a fourth party forming character. In the party formation screen, information concerning the first party forming character, the second party forming character, the third party forming character, and the fourth party forming character is displayed in this order from the left.

When the region where information concerning one of the party forming characters is tapped to select that party forming character, an owned character list screen, which is not shown, is displayed. The player can replace the party forming character by selecting one of the owned characters in the owned character list screen.

Note that the first party forming character displayed leftmost in the party formation screen is registered as the leader of the party. In the party formation screen, the leader can be changed, for example, by tapping the first party forming character and then tapping another party forming character. That is, the player can register the party forming character that serves as the leader in the party formation screen.

Furthermore, the player can register a plurality of parties in advance. Here, the player can register nine parties at most. In the party formation screen, when a flick operation in the horizontal direction is input, the party information that is displayed is switched. For example, when a leftward flick operation is input in the state where party information concerning a first party is displayed, as shown in FIG. 3A, party information concerning a second party is displayed, as shown in FIG. 3B.

The party whose party information is displayed in the party formation screen is registered as a party currently selected by the player. Suppose, for example, that another selecting part in the menu bar 30 is tapped in the state where the party information concerning the second party is displayed, as shown in FIG. 3B, whereby the displaying of the party formation screen is terminated. In this case, the second party, whose party information was displayed when the party formation screen was closed, is registered as the currently selected party.

Note that each character has set therefor parameters such as hit points (hereinafter referred to as HPs) and an attacking ability. The player can raise his/her owned characters. The player can enhance various kinds of parameters of owned characters by advancing the levels of the owned characters. In the party information displayed in the party formation screen, the parameters of the individual party forming characters are displayed. Note that in specific games (quests), in addition to raising owned characters, it is possible to raise and enhance dragons as well as equipment such as weapons, which will be described later. The raising and enhancement of owned characters, dragons, and equipment such as weapons in specific games (quests) cannot be performed during in-games (battle games), and can be performed during out-games.

Furthermore, although not described in detail, in the party formation screen, it is possible to equip each party forming character with equipment such as a weapon, as well as a dragon. Note that in specific games, the player can own dragons acquired through lotteries, called gacha, as well as dragons distributed from the administrator side. Furthermore, each weapon has a weapon type set therefor. In other words, each weapon is classified into a weapon type. Here, eight weapon types are provided, namely, sword, blade, knife, axe, spear, bow, rod, and wand. All the weapons are classified into one of the abovementioned eight weapon types. Furthermore, all the characters that can be owned by the player have only one corresponding weapon type set therefor. That is, each character has set therefor the weapon type of a weapon that the character can be equipped with. The player can equip each character with only a weapon of the weapon type corresponding to that character. For example, for a character corresponding to the sword, the player can equip the character with only a weapon with the weapon type of sword.

Furthermore, by providing equipment, the player can advantageously proceed with a battle game; for example, the player can increase parameters, such as the HPs and the attacking abilities, of the party forming characters participating in a battle game (hereinafter referred to as participating characters), or can decrease parameters of enemy characters.

Furthermore, a dragon is a character into which a participating character can transform itself. When a prescribed condition is satisfied during a battle game, only for a limited period, the player can transform a participating character into the dragon that the participating character is equipped with. Since a dragon can give great damage to enemy characters, it becomes possible to advantageously proceed with a battle game by transforming a participating character into a dragon.

Furthermore, each owned character and each item of equipment has skills set therefor in advance. A skill refers to a special ability that becomes available when a prescribed condition is satisfied during a battle game. The player can advantageously proceed with a battle game by using a skill. For example, the player can change various kinds of parameters by using skills, such as giving damage to enemy characters, increasing the attacking abilities of participating characters, recovering the HPs of participating characters, and decreasing the attacking abilities of enemy characters. In the party information displayed in the party formation screen, equipment information concerning the equipment and dragons of the individual party forming characters, as well as information concerning the skills, are displayed.

Figure 4A:
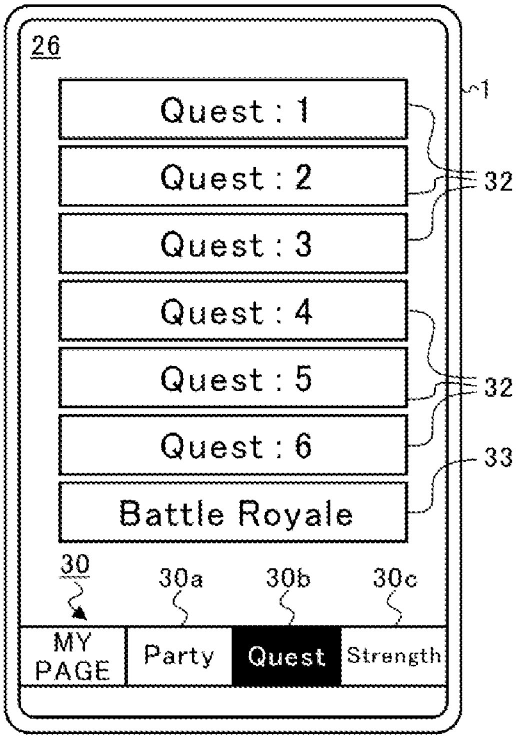
FIG. 4A is an illustration for explaining an example game selection screen.
Figure 4B:
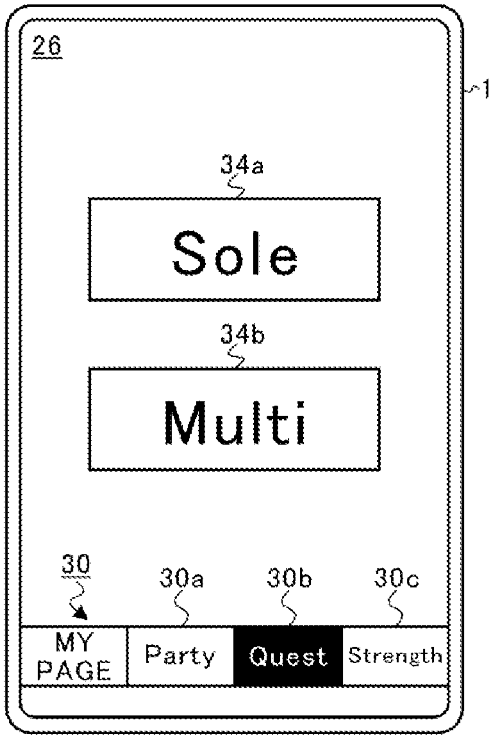
FIG. 4B is an illustration for explaining an example play-mode selection screen.
Figure 4C:
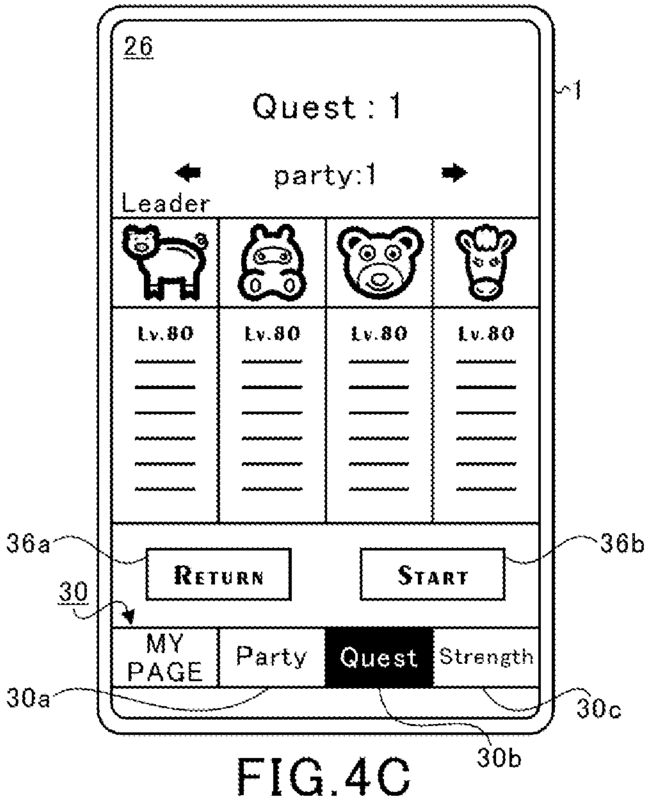
FIG. 4C is an illustration for explaining an example party selection screen.

FIG. 4A is an illustration for explaining an example game selection screen. FIG. 4B is an illustration for explaining an example play-mode selection screen. FIG. 4C is an illustration for explaining an example party selection screen. When the quest selecting part 30*b* in the menu bar 30 is tapped, the game selection screen shown in FIG. 4A is displayed. In this embodiment, as described earlier, specific games (quests) and prescribed games (battle royales) are provided. Here, quests and battle royales refer to the types of battle games, and can be considered as the content of battle games. In the quest selection screen, a plurality of quest-selection operating parts 32 and a battle-royale-selection operating part 33 are displayed.

The player can select one of the quests and can play a battle game by tapping one of the quest-selection operating parts 32. When one of the quest-selection operating parts 32 is tapped, the play-mode selection screen shown in FIG. 4B is displayed. In the play-mode selection screen, a solo-play selecting part 34*a* and a multi-play selecting part 34*b* are displayed. For each quest, the player can select either solo-play, in which the player operating the player terminal 1 plays a game alone, or multi-play, in which a plurality of player terminals 1 are communicatively connected and the players cooperatively play a game.

Note that although the description here will be given in the context of quests for which it is possible to select both solo-play and multi-play, quests for which only solo-play is possible and quests for which only multi-play is possible may be provided. The player can select solo-play as the play mode by tapping the solo-play selecting part 34*a*. Furthermore, the player can select multi-play as the play mode by tapping the multi-play selecting part 34*b*. The following first describes the specific content of a specific game (quest), and then describes a prescribed game (battle royale). Here, the description will be given in the context of the case where a specific game (quest) is executed via solo-play, and the case where a specific game (quest) is executed via multi-play is not described.

(Solo-Play)

When the solo-play selecting part 34*a* is tapped in the play-mode selection screen, the party selection screen shown in FIG. 4C is displayed. In the party selection screen, party information is displayed as shown in the figure. At the time of transition to the party selection screen, party information concerning the registered currently selected party is displayed in the party selection screen. In the party selection screen, the player can switch the party information displayed on the display 26, for example, by performing a flick operation in the horizontal direction. When the party information is switched in the party selection screen, the registered currently selected party is also changed. That is, the player can change the currently selected party in the party selection screen.

Furthermore, in the party selection screen, a return button 36*a* and a start button 36*b* are displayed. When the return button 36*a* is tapped, a screen transition occurs from the party selection screen shown in FIG. 4C to the play-mode selection screen shown in FIG. 4B. Meanwhile, when the start button 36*b* is tapped, a battle game via solo-play using the registered currently selected party is started.

Figure 5A:
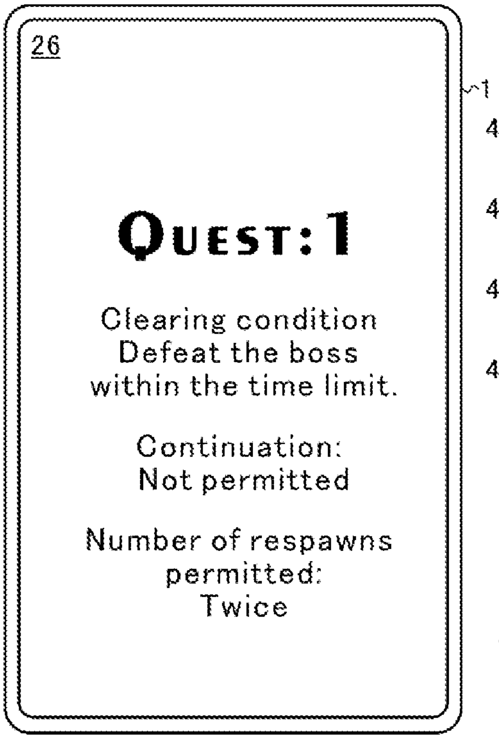
FIG. 5A is an illustration for explaining an example quest start screen.

FIG. 5A is an illustration for explaining an example quest start screen. When a battle game is started, the quest start screen is displayed, as shown in FIG. 5A. In the quest start screen, information concerning the quest (battle game) being started (quest information) is displayed. Here, as the quest information, a clearing condition for clearing the quest (also referred to as a winning condition for the player), whether or not continuation is permitted, and the number of respawns permitted are displayed.

Each quest has set therefor a clearing condition. Here, as an example, defeating the boss character among enemy characters within a time limit is set as a clearing condition. Note that clearing conditions are set in advance for individual quests; other example clearing conditions include annihilating all the enemy characters.

Furthermore, each quest has set therefor whether or not continuation is permitted, as well as the number of continuations permitted. In this embodiment, in a battle game via solo-play, the player is defeated on condition that all the participating characters have entered a continuation disabled state, i.e., on condition that all the participating characters have been annihilated.

Here, the state in which the HPs of a participating character have become zero is defined as a continuation disabled state, and the state in which the HPs of a participating character have not become zero is defined as a continuation enabled state. Participating characters in the continuation enabled state perform actions on the basis of operations input to the player terminal 1 or on the basis of computer control. Meanwhile, participating characters in the continuation disabled state are disabled from performing actions.

In a continuable quest, in the case where all the participating characters have been annihilated, the player can select whether or not to continue the quest by consuming a prescribed in-game currency. When the player executes continuation, all the participating characters are restored from the continuation disabled state to the continuation enabled state, which makes it possible to continue the quest (battle game).

Furthermore, each quest has set therefor whether or not respawns are permitted and the number of respawns permitted. Here, a "respawn" in a battle game refers to restoring a participating character that has entered the continuation disabled state into the continuation enabled state in the case where a respawn condition is satisfied, similarly to the continuation described above. In a battle game via solo-play, each participating character has set therefor the number of respawns permitted. Furthermore, it is determined that the respawn condition is satisfied in the case where all the participating characters have been annihilated and there is a participating character for which one or more respawns are permitted.

That is, in a quest in which respawns are permitted, even if all the participating characters have been annihilated, a defeat for the player is avoided if there is a participating character for which one or more respawns are permitted. Meanwhile, when all the participating characters have been annihilated, in the case where there is no participating character for which one or more respawns are allowed and a continuation is not executed or a continuation cannot be executed, a defeat for the player is determined at that timing.

Figure 5B:
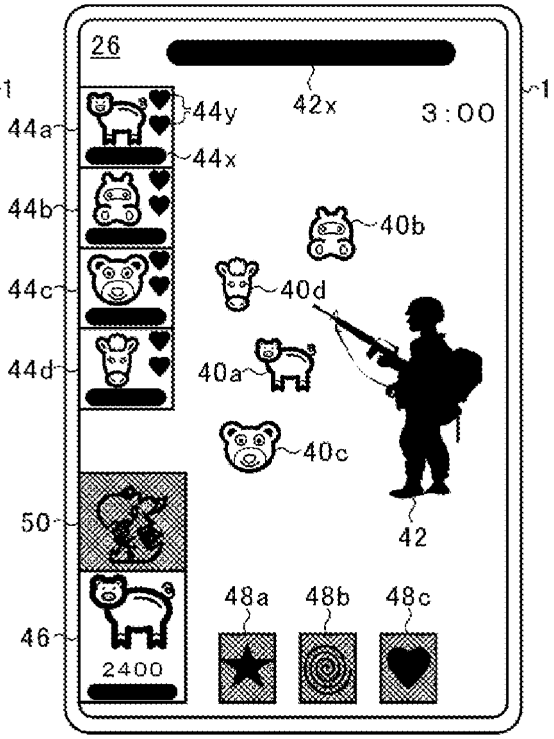
FIG. 5B is an illustration for explaining an example battle game screen during a battle game via solo-play.
Figure 5C:
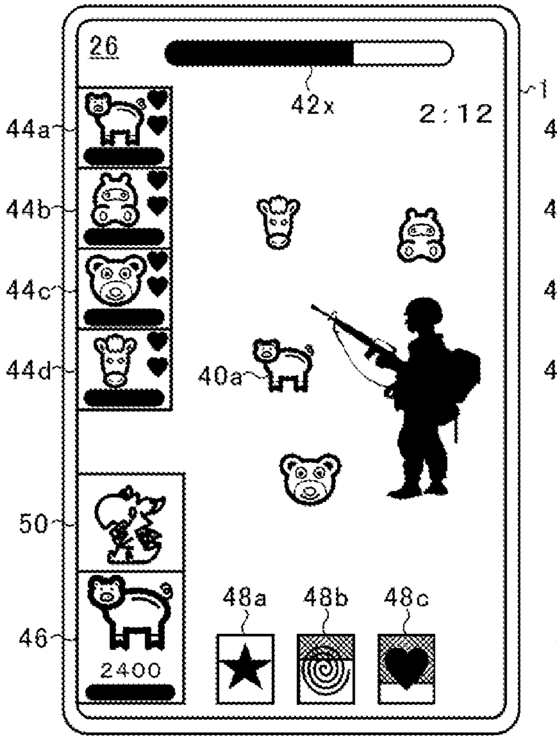
FIG. 5C is an illustration for explaining an example of skill gauges and a dragonization gauge.
Figure 5D:
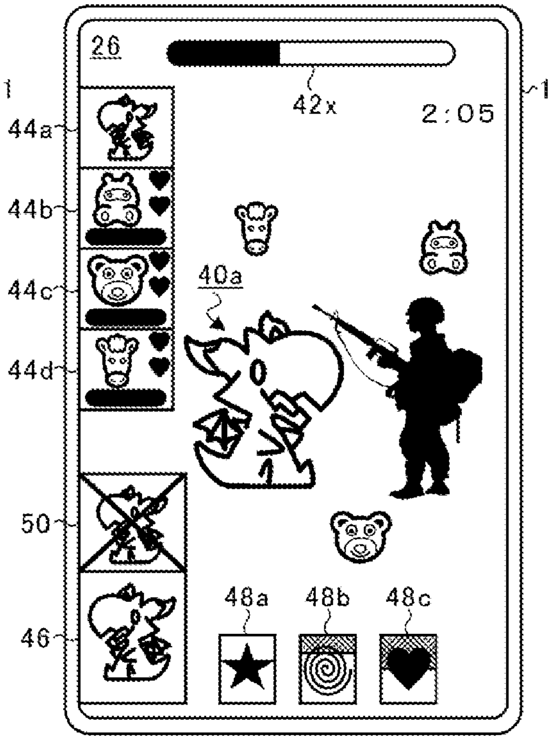
FIG. 5D is an illustration for explaining dragonization.

FIG. 5B is an illustration for explaining an example battle game screen during a battle game via solo-play. FIG. 5C is an illustration for explaining an example of skill gauges 48*a*, 48*b*, and 48*c* as well as a dragonization gauge 50. FIG. 5D is an illustration for explaining dragonization. When a battle game is started and the quest start screen shown in FIG. 5A is displayed for a prescribed period, the battle game screen is displayed, as shown in FIG. 5B. In the battle game screen, a virtual game field is displayed, and a first participating character 40*a*, a second participating character 40*b*, a third participating character 40*c*, and a fourth participating character 40*d*, which are participating characters, as well as a boss character 42, are displayed in the game field. Note that the first participating character 40*a* to the fourth participating character 40*d* are the first party forming character to the fourth party forming character, respectively. Therefore, the first participating character 40*a* is a participating character registered as the leader.

In a battle game, one of the four participating characters is set as an operable character, which can be operated by the player. That is, the operable character is a participating character that operates on the basis of operations input to the player terminal 1. When a battle game is started, the participating character registered as the leader, i.e., the first participating character 40*a*, is set as the operable character.

The player can cause the operable character to perform an attacking action by tapping the region where the game field is displayed in the battle game screen. Furthermore, the player can cause the operable character to move in the operated direction by performing a slide operation or flick operation in the region where the game field is displayed in the battle game screen. Meanwhile, the three participating characters, not including the operable character, perform actions on the basis of computer control. Hereinafter, participating characters that perform actions on the basis of computer control will be referred to as non-operated characters.

The player can change the operable character during a battle game. Specifically, in the battle game screen, a first character-information displaying part 44*a*, a second character-information displaying part 44*b*, a third character-information displaying part 44*c*, and a fourth character-information displaying part 44*d* are displayed as character-information displaying parts. The first character-information displaying part 44*a* to the fourth character-information displaying part 44*d* respectively correspond to the first participating character 40*a* to the fourth participating character 40*d*, and display information concerning the corresponding participating characters.

The player can switch the operable character by tapping one of the character-information displaying parts. For example, when the fourth character-information displaying part 44*d* is tapped in the state where the first participating character 40*a* is set as the operable character, the fourth participating character 40*d* is set as the operable character, and the first participating character 40*a* is set as a non-operated character. This makes it possible for the player to operate the fourth participating character 40*d* by inputting operations to the player terminal 1.

Note that a character image is displayed in each of the character-information displaying parts so that the corresponding participating character can be identified. Furthermore, an HP meter 44*x* indicating the HPs of the corresponding participating character is displayed in each of the character-information displaying parts. Furthermore, respawn information 44*y* indicating the number of respawns permitted by the corresponding participating character is displayed in each of the character-information displaying parts. Here, the same number of heart marks as the number of respawns permitted are displayed as the respawn information 44*y*.

Furthermore, in a lower left part of the battle game screen, an operable-character displaying part 46 is displayed separately from the character-information displaying parts. The operable-character displaying part 46 serves to report the participating character currently set as the operable character, as well as the HPs of the operable character.

Furthermore, three skill gauges 48*a*, 48*b*, and 48*c* are displayed in the battle game screen. As described earlier, characters and equipment have available skills set therefor in advance. The skill gauges 48*a*, 48*b*, and 48*c* report the specifics of the skills available to the operable character, whether or not the use of the skills is permitted, and the gauge values remaining before the skills become available.

Specifically, each skill has set therefor in advance a gauge value that is necessary for the skill to become available. The gauge values of the skill gauges 48*a*, 48*b*, and 48*c* increase, for example, in accordance with the values of damage given to the boss character 42 or the like by the operable character. In the state where a gauge value is less than the necessary gauge value, the corresponding skill is not available, and the skill becomes available when the gauge value becomes greater than or equal to the necessary gauge value. The gauge values are managed on a per-skill basis. In the state where the skills are unavailable, the skill gauges 48*a*, 48*b*, and 48*c* are partially or entirely grayed out, as shown in FIG. 5B. Then, as the gauge values increase and approach the necessary gauge values, the grayed-out areas decrease, as shown in FIG. 5C.

FIG. 5C shows the state in which the skill corresponding to the skill gauge 48*a* is available. Furthermore, FIG. 5C shows the state in which the skills corresponding to the skill gauges 48*b* and 48*c* are unavailable. In the state shown in FIG. 5C, the player can use the skill corresponding to the skill gauge 48*a* by tapping the skill gauge 48*a*. When the skill is used, the gauge value corresponding to the skill becomes zero, whereby the skill becomes unavailable. In this manner, the skill gauges 48*a*, 48*b*, and 48*c* also function as operating parts for using skills.

Furthermore, in the battle game screen, a dragonization gauge 50 is displayed. As described earlier, each participating character can be equipped with a dragon. The dragonization gauge 50 reports a dragon that the operable character is equipped with, whether or not transformation into the dragon is permitted, and the gauge value remaining before transformation into the dragon becomes possible.

Specifically, each dragon or each participating character has set therefor in advance a gauge value necessary for enabling transformation into the dragon. The gauge value of the dragonization gauge 50 increases, for example, in accordance with the value of damage given to the boss character 42 or the like by the operable character. Transformation into the dragon is not permitted in the state where the gauge value is less than the necessary gauge value, and transformation into the dragon is enabled when the gauge value becomes greater than or equal to the necessary gauge value. The gauge value necessary for transformation into the dragon is managed separately from the skills described above. In the state where transformation into the dragon is disabled, the dragonization gauge 50 is partially or entirely grayed out, as shown in FIG. 5B. Then, as the gauge value increases and approaches the necessary gauge value, the grayed-out area decreases.

FIG. 5C shows the state in which the operable character can transform itself into the dragon that the operable character is equipped with. In the state shown in FIG. 5C, the player can transform the operable character into the dragon by tapping the dragonization gauge 50. For example, when the dragonization gauge 50 is tapped in the state shown in FIG. 5C, the operable character (the first participating character 40*a* here) transforms itself into the dragon, as shown in FIG. 5D. In this state, the dragon is displayed in the operable-character displaying part 46 and the character-information displaying part corresponding to the operable character (the first character-information displaying part 44*a* here). Furthermore, the player can cause the dragon to perform actions by inputting operations to the player terminal 1.

Upon the transformation into the dragon, the gauge value for the dragon becomes zero, whereby transformation into the dragon is again disabled. During the period in which the operable character is transformed into the dragon, the dragonization gauge 50 is displayed in the manner shown in FIG. 5D. The period during which transformation into the dragon is enabled (transformation enabled period) is set in advance, and after the expiration of the transformation enabled period, the dragon is transformed back to the original participating character (the first participating character 40*a* here). Furthermore, after the expiration of the transformation enabled period, the dragonization gauge 50 is displayed in a grayed-out manner, as shown in FIG. 5B. Then, after the expiration of a certain period, it becomes possible to increase the gauge value of the dragonization gauge 50 again. Then, when the gauge value of the dragonization gauge 50 becomes greater than or equal to the necessary gauge value, transformation into the dragon becomes possible again.

Although not described in detail, gauge values for dragons and gauge values for individual skills are also managed in relation to non-operated characters. However, with non-operated characters, although there are cases where the skills are used under computer control, transformation into a dragon does not occur.

Furthermore, in an upper part of the battle game screen, a boss-character HP meter 42*x* indicating the HPs of the boss character 42, as well as a time limit, i.e., the time remaining before the end of the battle game, are displayed. Each battle game has a clearing condition (winning condition) and a defeat condition (failure to satisfy the clearing condition) set therefor in advance. The player wins when the winning condition is satisfied in the battle game. Furthermore, the player is defeated when the defeat condition is satisfied, and the battle game comes to an end. Here, the condition that the HPs of the boss character 42 have become zero is set as the winning condition. That is, the player wins when the HPs of the boss character 42 have become zero.

Figure 6A:
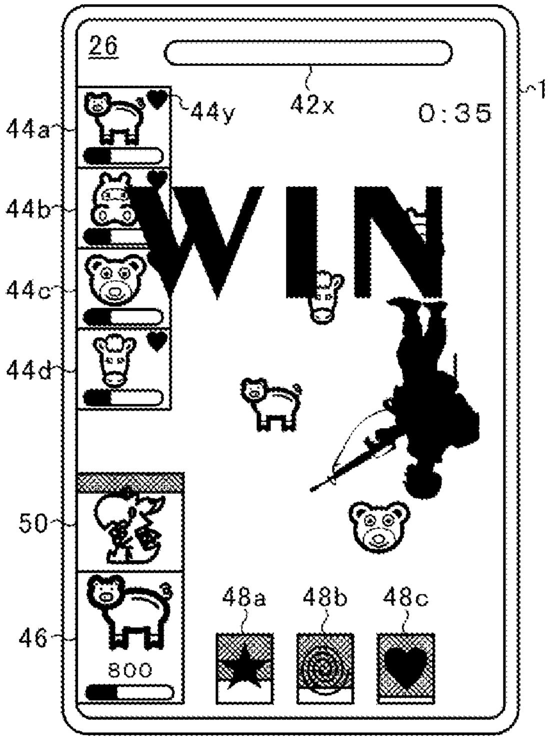
FIG. 6A is an illustration for explaining an example battle game screen for the case of a victory for a player.
Figure 6B:
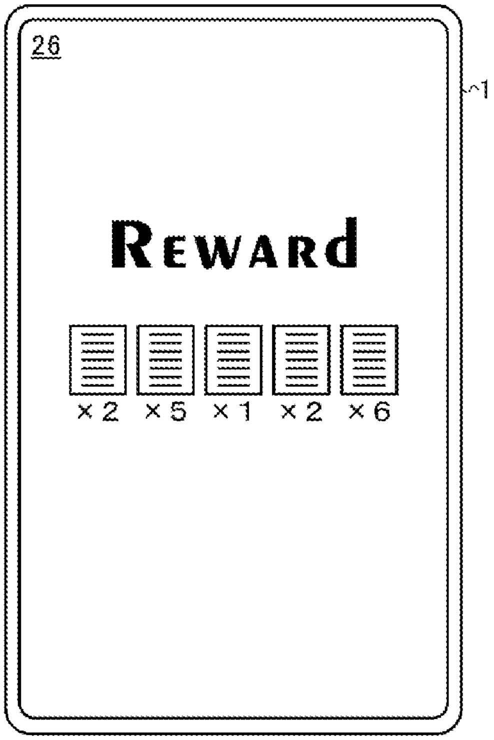
FIG. 6B is an illustration for explaining an example reward screen.

FIG. 6A is an illustration for explaining an example battle game screen for the case of a victory for the player. FIG. 6B is an illustration for explaining an example reward screen. When the HPs of the boss character 42 have become zero, an image reporting a victory for the player is displayed, as shown in FIG. 6A, and the battle game comes to an end. Then, the reward screen is displayed, as shown in FIG. 6B, reporting the reward acquired as a result of the success in the quest, i.e., the victory in the battle game. The reward that can be acquired by the player varies among the individual quests, and also varies depending on the number of continuations as well as the number of respawns.

(Battle Royale)

Figure 7A:
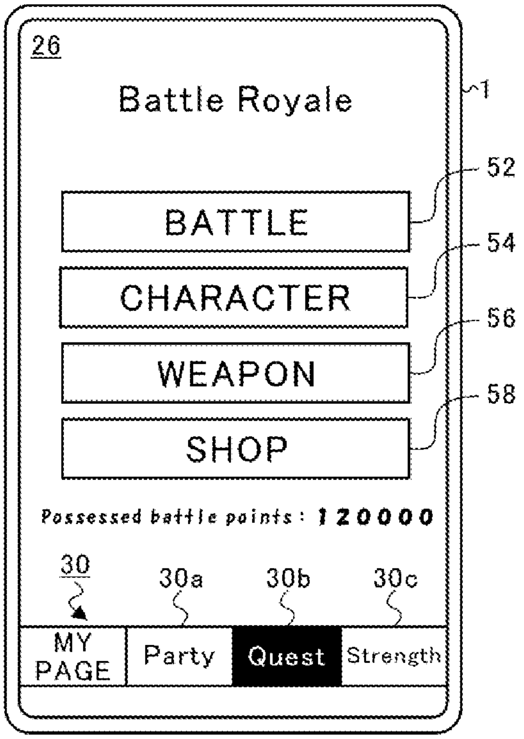
FIG. 7A is an illustration for explaining an example battle-royale selection screen.
Figure 7B:
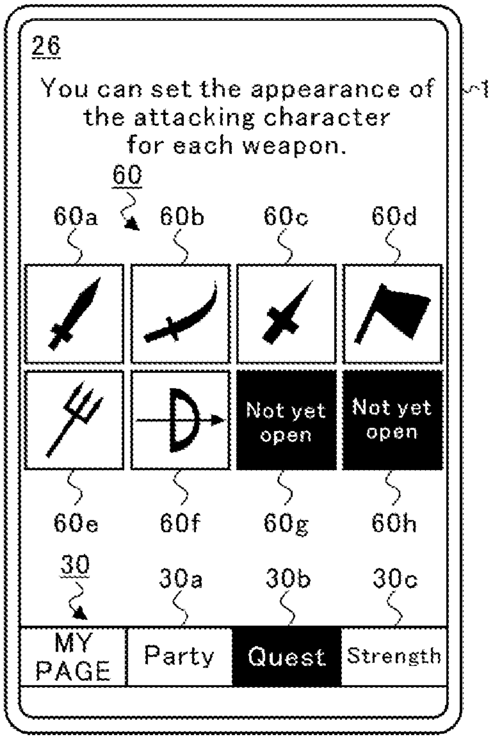
FIG. 7B is an illustration for explaining an example character-skin setting screen.
Figure 7C:
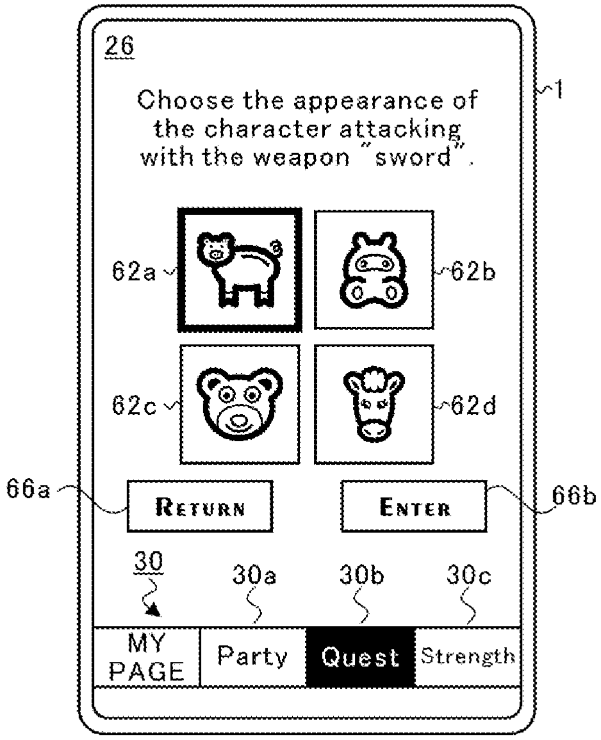
FIG. 7C is an illustration for explaining an example character-skin selection screen.
Figure 7D:
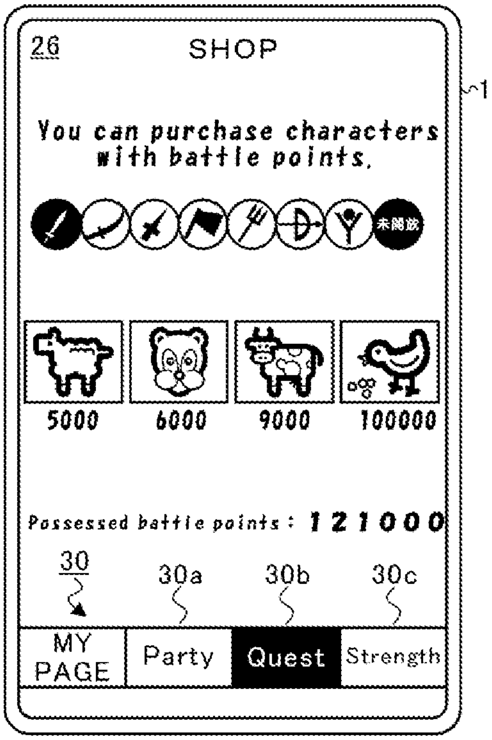
FIG. 7D is an illustration for explaining an example exchange screen.

FIG. 7A is an illustration for explaining an example battle-royale selection screen, FIG. 7B is an illustration for explaining an example character-skin setting screen, FIG. 7C is an illustration for explaining an example character-skin selection screen, and FIG. 7D is an illustration for explaining an example exchange screen. When the battle-royale-selection operating part 33 is tapped in the game selection screen shown in FIG. 4A, the battle-royale selection screen shown in FIG. 7A is displayed. In the battle-royale selection screen, a battle-selection operating part 52, a character-skin-selection operating part 54, a weapon-skin-selection operating part 56, and an exchange-selection operating part 58 are displayed, as shown in the figure. Furthermore, in the battle-royale selection screen, battle points possessed by the player are displayed, as shown in the figure. It is possible to use the battle points as an in-game currency that can be used only within a battle royale.

In this embodiment, it is possible to set the appearances (also referred to as character skins) of characters that are used by the player in a battle royale. Furthermore, in this embodiment, it is possible to set the appearances (also referred to as weapon skins) of weapons that are used by the player in a battle royale. As will be described later in detail, in this embodiment, statuses that are common to all players are set for each of the weapon types (eight types in this embodiment, namely, sword, blade, knife, axe, spear, bow, rod, and wand). The character skins and weapon skins do not affect the statuses, and serve for the player to enjoy the appearances. Note, however, that in prescribed games (battle royales), it may be allowed to raise and enhance some of the statuses, such as the HPs, for each of the weapon types in out-games.

When the character-skin-selection operating part 54 is operated in the battle-royale selection screen, the character-skin setting screen shown in FIG. 7B is displayed. As shown in the figure, weapon-type icons 60 are displayed in a central part of the character-skin setting screen. Eight types of weapon-type icons 60 are provided, namely, a sword icon 60*a*, a blade icon 60*b*, a knife icon 60*c*, an axe icon 60*d*, a spear icon 60*e*, a bow icon 60*f*, a rod icon 60*g*, and a wand icon 60*h*.

Note that in battle royales, prescribed opening conditions are set, and weapon types that are available become open when the opening conditions are cleared. The opening conditions include the condition that an experience value that can be acquired in a battle royale has reached a certain value and the condition that a prescribed mission that is set in a battle royale has been accomplished. Here, the case where the rod icon 60*g* and the wand icon 60*h* have not yet become open is shown.

Furthermore, when one of the sword icon 60*a*, the blade icon 60*b*, the knife icon 60*c*, the axe icon 60*d*, the spear icon 60*e*, and the bow icon 60*f*, which have become open, is tapped in the character-skin setting screen shown in FIG. 7B, the character-skin selection screen shown in FIG. 7C is displayed. It is supposed here that the sword icon 60*a* is tapped in the character-skin setting screen.

In the character-skin selection screen, character skins 62 owned by the player and corresponding to the weapon type are displayed. Here, as characters corresponding to the weapon type "sword", a first character skin 62*a*, a second character skin 62*b*, a third character skin 62*c*, and a fourth character skin 62*d*, which are owned by the player, are displayed as the character skins 62. Note that all the character skins that can be owned by the player have only one corresponding weapon type set therefor. That is, each of the character skins has set therefor the weapon type of a weapon that the character skin can be equipped with. The player can equip each of the weapon types only with the character skin corresponding to that weapon type. For example, for the sword, the player can set only the character skin corresponding to the sword.

In battle royales, prescribed possession conditions concerning character skins are set. The player can possess character skins corresponding to weapon types by clearing the possession conditions. As an example possession condition, a condition is set such that in response to the opening of a weapon type, a character skin that serves as a default for the open weapon type is distributed or provided for free. As another example possession condition, purchase by consuming the battle points described earlier is set. As described earlier, in specific games (quests), the player can own characters acquired through lotteries, called gacha, as well as characters distributed from the administrator side. That is, the conditions for owning characters (character skins) vary between specific games (quests) and prescribed games (battle royales). Meanwhile, the appearances (images) of characters that are used in games and the weapon types corresponding to the individual characters are shared between specific games (quests) and prescribed games (battle royales).

Furthermore, a return button 66*a* and an enter button 66*b* are displayed in the character-skin selection screen. When the return button 66*a* is tapped, a screen transition occurs from the character-skin selection screen shown in FIG. 7C to the character-skin setting screen shown in FIG. 7B.

Meanwhile, when the enter button 66*b* is tapped and a character-skin setting operation is performed, the content of the currently selected character skin 62 is set as the character skin corresponding to the weapon type that is used in a battle royale.

Furthermore, when the exchange-selection operating part 58 is operated in the battle-royale selection screen, the exchange screen shown in FIG. 7D is displayed. As shown in the figure, the exchange screen tells that it is possible to purchase a character skin by consuming battle points in accordance with a player's operation. Furthermore, when a displayed character skin is tapped and a purchase operation is executed in the exchange screen, battle points possessed by the player are consumed, whereby the player can acquire the desired character skin. Furthermore, it may be allowed to purchase weapon skins as well as character skins by consuming battle points.

Figure 8A:
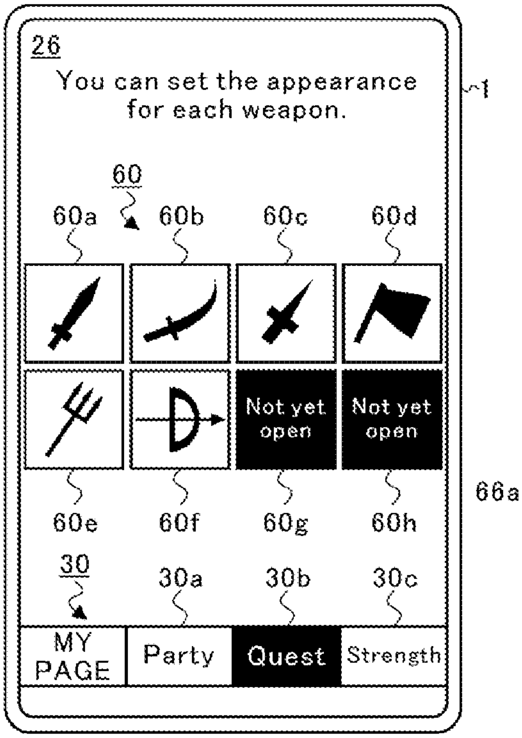
FIG. 8A is an illustration for explaining an example weapon-skin setting screen.
Figure 8B:
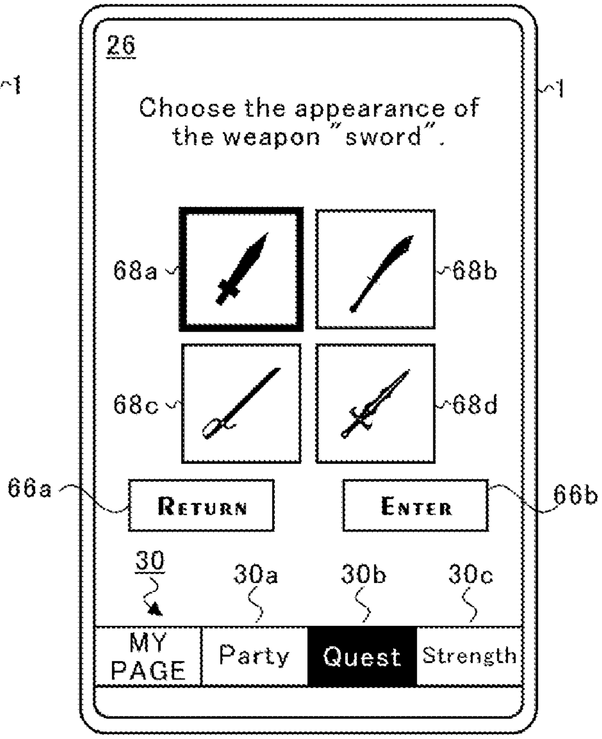
FIG. 8B is an illustration for explaining an example weapon-skin selection screen.
Figure 8C:
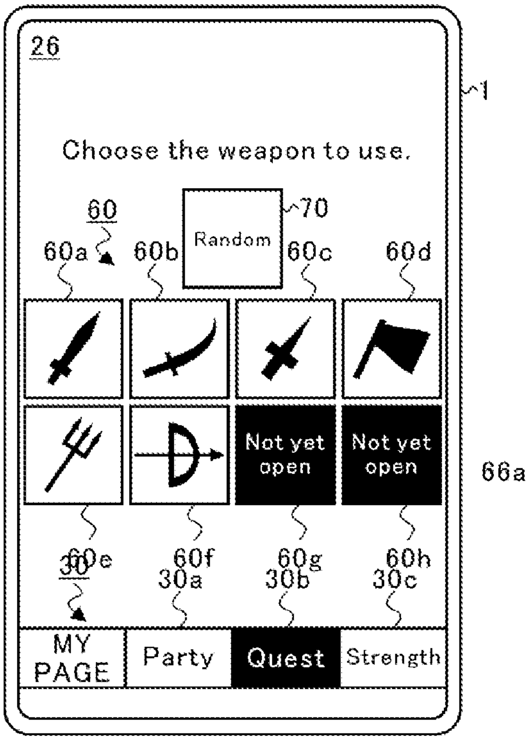
FIG. 8C is an illustration for explaining an example weapon selection screen.
Figure 8D:
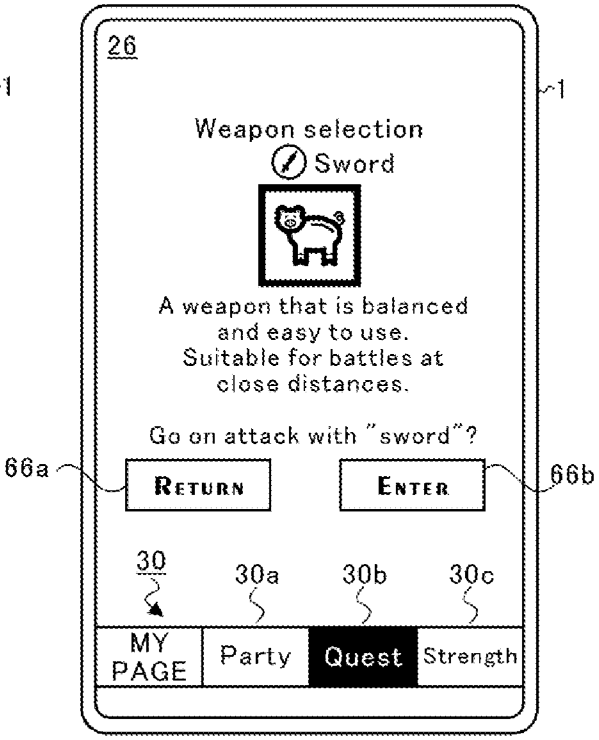
FIG. 8D is an illustration for explaining an example weapon setting screen.

FIG. 8A is an illustration for explaining an example weapon-skin setting screen, FIG. 8B is an illustration for explaining an example weapon-skin selection screen, FIG. 8C is an illustration for explaining an example weapon selection screen, and FIG. 8D is an illustration for explaining an example weapon setting screen. When the weapon-skin-selection operating part 56 is operated in the battle-royale selection screen in FIG. 7A, the weapon-skin setting screen shown in FIG. 8A is displayed. As shown in the figure, the weapon-type icons 60 are displayed in a central part of the weapon-skin setting screen. At this time, also in the weapon-skin setting screen, similarly to the character-skin setting screen described above, the rod icon 60*g* and the wand icon 60*h* have not yet become open.

Furthermore, when one of the sword icon 60*a*, the blade icon 60*b*, the knife icon 60*c*, the axe icon 60*d*, the spear icon 60*e*, and the bow icon 60*f*, which have become open, is tapped in the weapon-skin setting screen shown in FIG. 8A, the weapon-skin selection screen shown in FIG. 8B is displayed. It is supposed here that the sword icon 60*a* is tapped in the weapon-skin setting screen.

In the weapon-skin selection screen, weapon skins 68 owned by the player are displayed. Here, as weapon skins corresponding to the weapon type "sword", a first weapon skin 68*a*, a second weapon skin 68*b*, a third weapon skin 68*c*, and a fourth weapon skin 68*d*, which are owned by the player, are displayed as the weapon skins 68.

In battle royales, prescribed possession conditions concerning weapon skins are set. The player can possess weapon skins corresponding to weapon types by clearing the possession conditions. As example possession condition, free distribution of default weapon skins corresponding to open weapon types as the weapon types become open and purchase by consumption of battle points described earlier are set.

Furthermore, a return button 66*a* and an enter button 66*b* are displayed in the weapon-skin selection screen. When the return button 66*a* is tapped, a screen transition occurs from the weapon-skin selection screen shown in FIG. 8B to the weapon-skin setting screen shown in FIG. 8A.

Meanwhile, when the enter button 66*b* is tapped and a weapon-skin setting operation is performed, the currently selected weapon skin 68 is set as the weapon skin corresponding to the weapon type that is used in a battle royale.

When a battle selection operation is executed by operating the battle-selection operating part 52 in the battle-royale selection screen in FIG. 7A, the weapon selection screen shown in FIG. 8C is displayed. As shown in the figure, the weapon-type icons 60 are displayed in a central part of the weapon selection screen. At this time, also in the weapon selection screen, similarly to the character-skin selection screen and the weapon-skin selection screen described above, the rod icon 60*g* and the wand icon 60*h* have not yet become open. The player can select the type of weapon that is used in the current battle royale by tapping one of the sword icon 60*a*, the blade icon 60*b*, the knife icon 60*c*, the axe icon 60*d*, the spear icon 60*e*, and the bow icon 60*f*, which have become open, in the weapon selection screen in FIG. 8C.

Furthermore, as shown in the figure, a random icon 70 is displayed above the weapon-type icons 60. In the case where the player taps the random icon 70 in the weapon selection screen in FIG. 8C, one of the sword icon 60*a*, the blade icon 60*b*, the knife icon 60*c*, the axe icon 60*d*, the spear icon 60*e*, and the bow icon 60*f*, which have become open, is selected with a prescribed probability as the weapon that is used in the current battle royale.

Furthermore, when one of the sword icon 60*a*, the blade icon 60*b*, the knife icon 60*c*, the axe icon 60*d*, the spear icon 60*e*, and the bow icon 60*f*, which have become open, or the random icon 70 is tapped in the weapon selection screen in FIG. 8C, a screen transition to the weapon setting screen shown in FIG. 8D occurs.

As shown in the figure, in the weapon setting screen, the type of weapon selected in the weapon selection screen as well as the character skin set to that weapon are displayed.

Furthermore, in a lower part of the weapon setting screen, a return button 66*a* and an enter button 66*b* are displayed. When the return button 66*a* is tapped, a screen transition occurs from the weapon setting screen shown in FIG. 8D to the weapon selection screen shown in FIG. 8C.

Figure 9A:
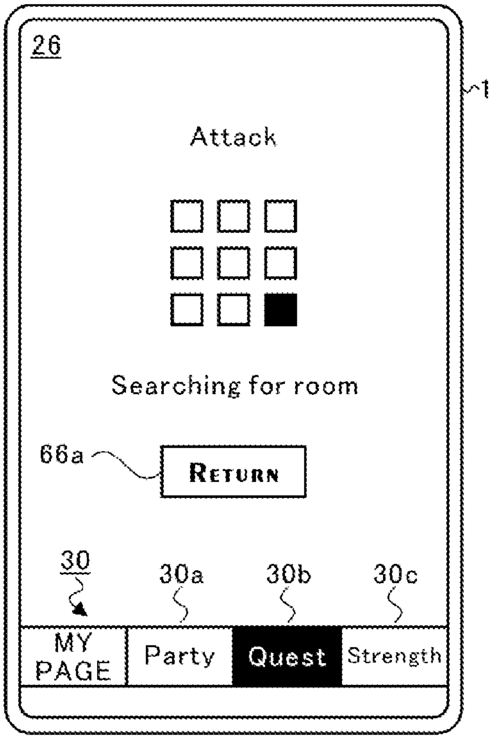
FIG. 9A is an illustration for explaining an example matching screen.
Figure 9B:
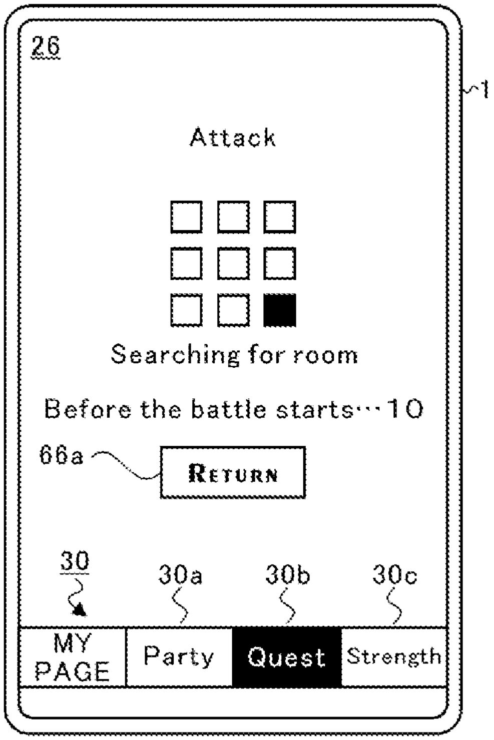
FIG. 9B is an illustration for explaining an example count-down screen.

FIG. 9A is an illustration for explaining an example matching screen, and FIG. 9B is an illustration for explaining an example count-down screen. When the enter button 66*b* is tapped and a weapon setting operation is executed in the weapon setting screen in FIG. 8D, a screen transition to the matching screen shown in FIG. 9A occurs.

Furthermore, when a prescribed matching condition is satisfied, a screen transition from the matching screen in FIG. 9A to the count-down screen in FIG. 9B occurs. Matching will be described later in detail. In the count-down screen, the time before the start of the battle royale game is counted down.

Figure 10A:
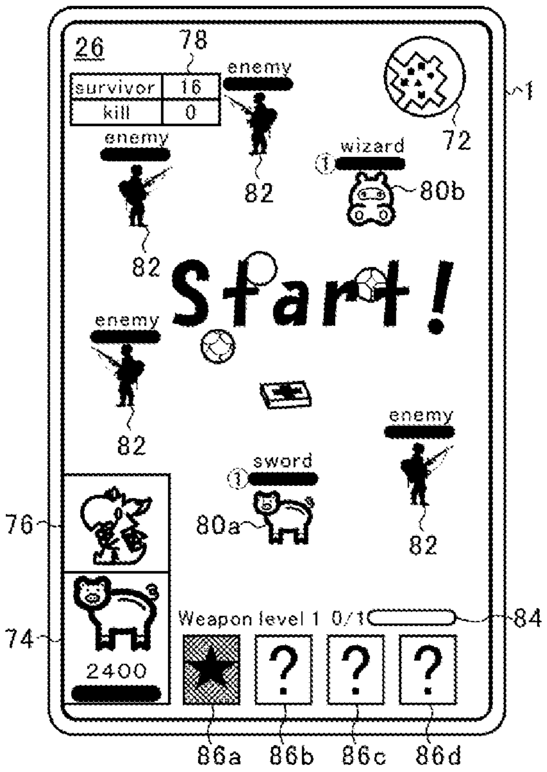
FIG. 10A is an illustration for explaining an example battle game screen at the start of a battle royale.
Figure 10B:
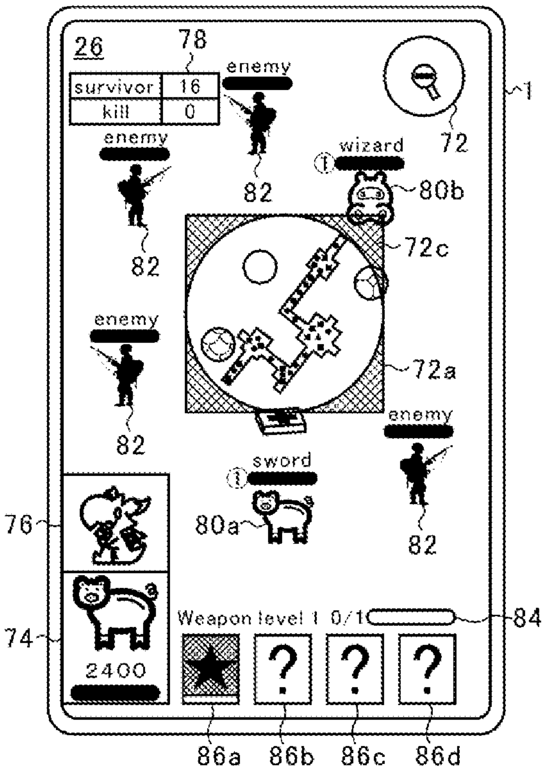
FIG. 10B is an illustration for explaining an example battle game screen in the case where a reduced map is displayed in an enlarged size.

FIG. 10A is an illustration for explaining an example battle game screen at the start of a battle royale. Furthermore, FIG. 10B is an illustration for explaining an example battle game screen in the case where a reduced map 72 is displayed in an enlarged size. At the start of a battle game of battle royale, a message indicating the start of the game is displayed in a central part of the battle game screen, as shown in FIG. 10A.

In the battle game screen, a virtual game field is displayed, and in this game field, an operable character 80*a*, which can be operated by the player, an other-player character 80*b*, which is operated by another player, NPCs, which are not shown, and enemy characters 82 are displayed. At this time, images corresponding to the weapon skin and the character skin set by the player are displayed for the operable character 80*a*.

The player can cause the operable character 80*a* to perform an attacking action by tapping the region where the game field is displayed in the battle game screen. Furthermore, the player can cause the operable character 80*a* to move in the operated direction by performing a slide operation or a flick operation in the region where the game field is displayed in the battle game screen. Meanwhile, NPCs and the enemy characters 82 perform actions on the basis of computer control.

Furthermore, in an upper right part of the battle game screen, a reduced map 72 is displayed, in which information for indicating the positions of the other-player character 80*b*, NPCs, and enemy characters 82 present in the vicinity of the operable character 80*a* is displayed. When the reduced map 72 is tapped in the battle game screen, the enlarged map 72*a* is displayed in a central part of the battle game screen, as shown in FIG. 10B. Furthermore, when the reduced map 72 is tapped while the enlarged map 72*a* is displayed, the displaying of the enlarged map 72*a* is terminated.

In the enlarged map 72*a*, a miasma range 72*c* is displayed, as well as the entire game field in which the battle royale is being executed. Note that in the case where the operable character 80*a* is present in the vicinity of the miasma range 72*c*, the miasma range 72*c* is also displayed in the reduced map 72.

In this embodiment, the game is designed such that the miasma range 72*c* expands as the time elapses from the start of a battle royale. Furthermore, the HPs of the operable character 80*a*, the other-player character 80*b*, and the NPCs decrease while these characters are present in the miasma range 72*c*. Therefore, the substantial effective action range in the game field becomes narrower as the time elapses from the start of a battle royale. This makes it possible to hinder the battle game from taking a meaninglessly long time.

Furthermore, in a lower left part of the battle game screen, an operable-character displaying part 74 is displayed. The operable-character displaying part 74 indicates the character currently set as the operable character, as well as the HPs of the operable character 80*a*. Furthermore, it is possible to use the same image for the operable-character displaying part 46, which is displayed in the battle game screen for a specific game (quest), and the operable-character displaying part 74, which is displayed in the battle game screen for a prescribed game (battle royale).

Furthermore, for each of the operable character 80*a*, the other-player character 80*b*, and the NPCs, the name, the HPs, and the weapon level are displayed. Furthermore, for each of the enemy characters 82, the name and the HPs are displayed. Furthermore, in a lower part of the battle game screen, the current weapon level of the operable character 80*a*, the number of points needed for increasing the weapon level, and a point gauge 84 visually indicating the number of points needed for increasing the weapon level are displayed.

Furthermore, battle status information 78 is displayed in an upper left part of the battle game screen. As the battle status information 78, the number of surviving players, as well as information concerning the number of defeated players, are displayed.

Furthermore, in the battle game screen, four skill gauges in total, 86*a*, 86*b*, 86*c*, and 86*d*, are displayed. In battle royales, available skills are set in advance for each of the weapon types. At the start of a battle royale, of the available skills set in advance for each of the weapon types, a default skill is displayed in the skill gauge 86*a*. Note that it is possible to use the same images for the skill gauges 48*a*, 48*b*, and 48*c*, which are displayed in the battle game screen for a specific game (quest), and the skill gauges 86*a*, 86*b*, 86*c*, and 86*d*, which are displayed in the battle game screen for a prescribed game (battle royale).

Regarding the skill displayed in the skill gauge 86*a*, it is not possible to use the skill in the state where the gauge value is less than a necessary gauge value. Meanwhile, regarding the skill displayed in the skill gauge 86*a*, it becomes possible to use the skill when the gauge value becomes greater than or equal to the necessary gauge value. In the state where it is not possible to use the skill, the skill gauge 86*a* is partially or entirely grayed out, as shown in FIG. 10A. Then, as the gauge value increases and approaches the necessary gauge value, the grayed-out area decreases, as shown in FIG. 10B.

Meanwhile, at the start of a battle game of battle royale, "?" is displayed in the skill gauges 86*b*, 86*c*, and 86*d*, which indicates that available skills have not yet been acquired. As will be described later in detail, in a battle royale, when a skill item that makes it possible to invoke a skill has been acquired, the skill corresponding to the acquired skill item is acquired. Then, the indications of the skill gauges 86*b*, 86*c*, and 86*d* are changed from "?" to indications corresponding to the acquired skill. Thus, the player is notified that the skill has become available. Note that in this embodiment, the gauge values for the skills displayed in the skill gauges 86*b*, 86*c*, and 86*d* do not change as time elapses.

Figure 11A:
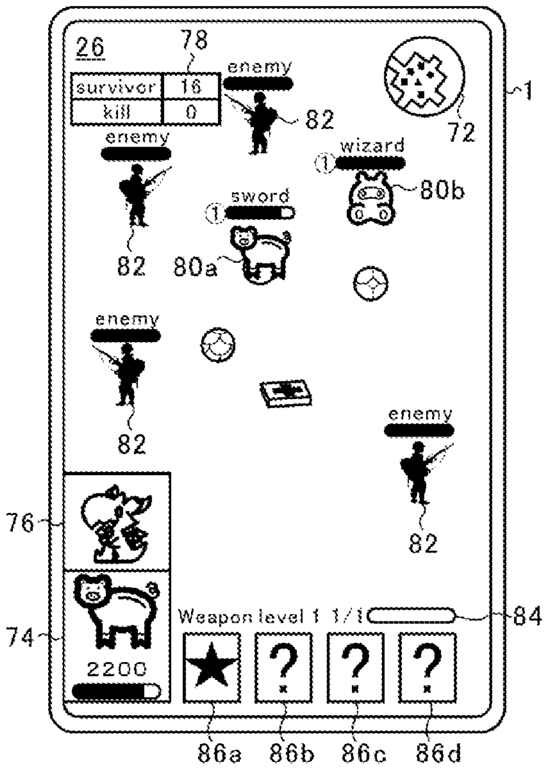
FIG. 11A is an illustration for explaining an example battle game screen at the time of acquiring an item that makes it possible to acquire weapon-level points.
Figure 11B:
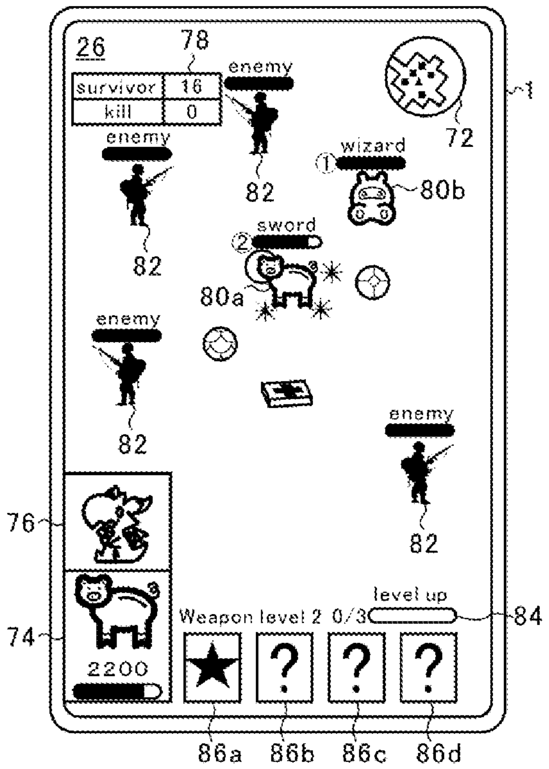
FIG. 11B is an illustration for explaining an example battle game screen in the case where a weapon level has been increased.
Figure 11C:
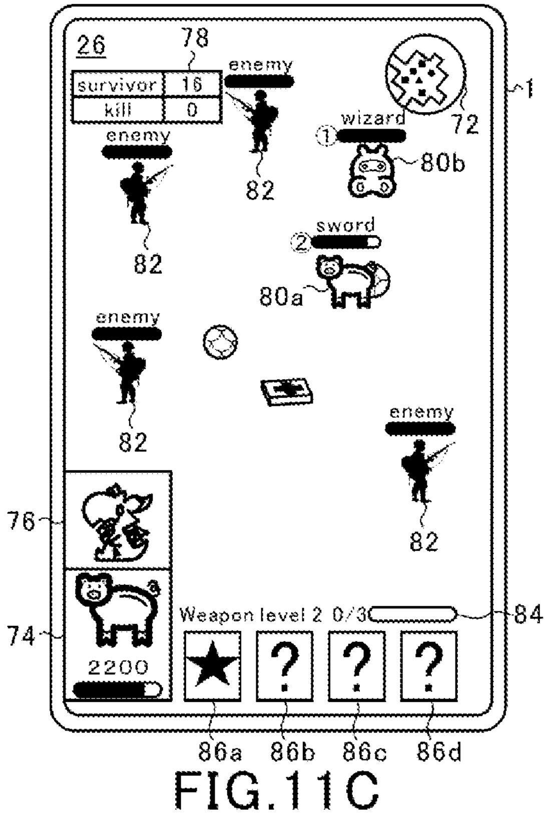
FIG. 11C is an illustration for explaining an example battle game screen at the time of acquiring an item that makes it possible to acquire weapon-level points.
Figure 11D:
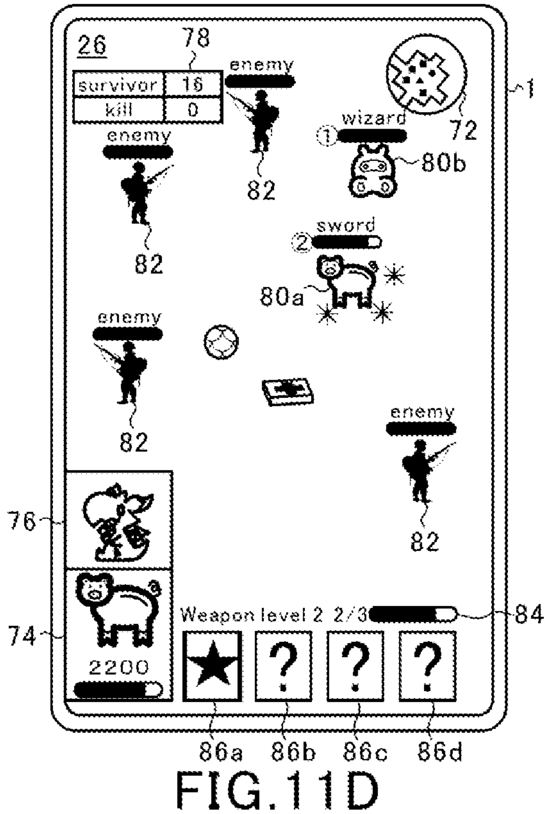
FIG. 11D is an illustration for explaining an example battle game screen in the case where weapon-level points have been acquired.

FIG. 11A is an illustration for explaining an example battle game screen at the time of acquiring a weapon enhancing item. FIG. 11B is an illustration for explaining an example battle game screen in the case where a weapon level has been increased. FIG. 11C is an illustration for explaining an example battle game screen at the time of acquiring a weapon enhancing item. FIG. 11D is an illustration for explaining an example battle game screen in the case where weapon-level points have been acquired. In this embodiment, the game is designed such that it is possible to increase the weapon level of the operable character 80*a* in one battle game of battle royale.

The weapon level is set to level 0 at the start of a game. In the case where the weapon level has been increased, the parameter of the attacking ability of the operable character 80*a* increases. Thus, when the weapon level is increased, the player can advantageously proceed with a battle game. In this embodiment, the rate by which the attacking ability is increased when the weapon level is increased is set in advance. This rate is determined on the basis of a table that is referred to commonly by all the players participating in a battle royale, and is a common numerical value irrespective of the weapon type.

In this embodiment, only the parameter of the attacking ability of the operable character 80*a* is increased when the weapon level is increased. However, parameters other than the attacking ability of the operable character 80*a* may be changed as the weapon level is increased. Alternatively, settings may be made such that the rate of the parameter that is changed varies among the individual weapon types.

As shown in FIG. 11A, various items are disposed in the game field. The items include weapon enhancing items that make it possible to acquire points needed for increasing the weapon level (hereinafter also referred to as weapon points). It is possible to acquire weapon points when such weapon enhancing items are acquired in a battle game.

Furthermore, as will be described later in detail, for each weapon level, the number of points needed for increasing the level to the next level is set in advance. Furthermore, when the acquired weapon points reach the number of points needed for increasing the level to the next level, the weapon level is increased, as shown in FIG. 11B. At this time, “level up” is displayed above a point gauge 84, which notifies the player that the weapon level has been increased.

Furthermore, among the weapon enhancing items, there are items with which the number of weapon points that can be acquired varies. Furthermore, the weapon enhancing items with different weapon points that can be acquired individually have different appearances. For example, in the case where a weapon enhancing item with which it is possible to acquire two weapon points has been acquired, as shown in FIG. 11C, the gauge value of the point gauge 84 increases in accordance with the weapon points acquired, as shown in FIG. 11D.

Note that in this embodiment, even when the weapon level is increased in a battle game, it is not possible to carry over the weapon level to the next battle game of battle royale. That is, in a battle game of battle royale, the weapon level starts from zero every time. This makes it possible to prevent disparities in the statuses of the operable character 80*a* at the start of a battle game of battle royale between advanced players and novice players of battle royales. Accordingly, it becomes possible to reduce the risk of narrowing strategic possibilities for players and thereby compromising the fun of the game.

Figure 12A:
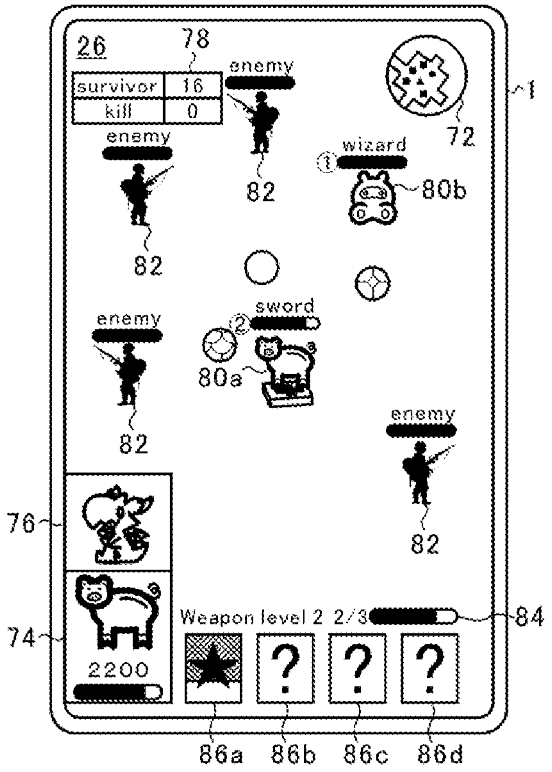
FIG. 12A is an illustration for explaining an example battle game screen at the time of acquiring a recovery item.
Figure 12B:
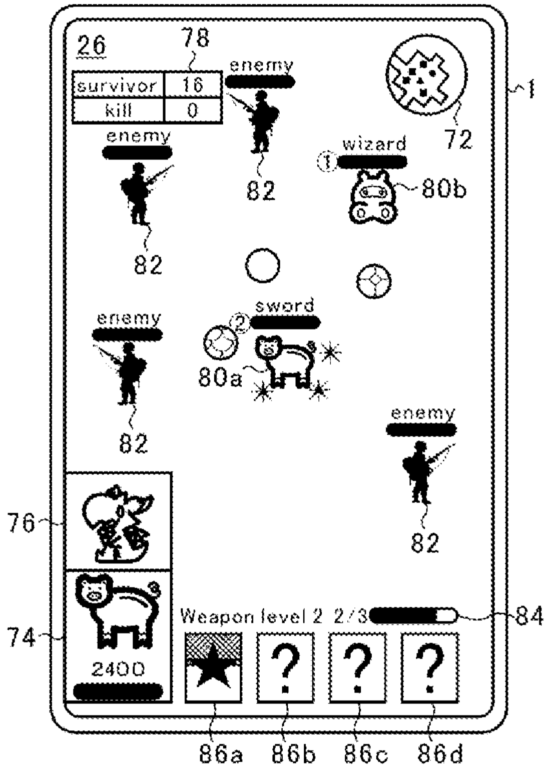
FIG. 12B is an illustration for explaining an example battle game screen in the case where HPs have been recovered.

FIG. 12A is an illustration for explaining an example battle game screen at the time of acquiring a recovery item. FIG. 12B is an illustration for explaining an example battle game screen in the case where HPs have been recovered. As shown in FIG. 12A, items include recovery items, with which it is possible to recover the HPs of the operable character 80*a*. When such a recovery item has been acquired in the battle game, it is possible to recover the HPs, as shown in FIG. 12B.

The recovery items include items with different amounts of HPs that are recovered. Furthermore, the recovery items with different amounts of HP that are recovered individually have different appearances. In the case where a recovery item has been acquired, the gauge value of the HPs of the operable character 80*a* increases in accordance with the acquired recovery item, as shown in FIG. 12B.

Furthermore, a dragonization gauge 76 is displayed in the battle game screen, as shown in FIG. 12A. In this embodiment, it is possible to transform the operable character 80*a* into a dragon (hereinafter also referred to as dragonization) during a battle game of battle royale. Note that it is possible to use the same image for the dragonization gauge 50, which is displayed in the battle game screen for a specific game (quest), and the dragonization gauge 76, which is displayed in the battle game screen for a prescribed game (battle royale).

Specifically, a necessary gauge value for enabling dragonization is set in advance. The gauge value of the dragonization gauge 76 increases in the case where the operable character 80*a* has defeated an NPC or the other-player character 80*b*. In the state where the gauge value is less than the necessary gauge value, the player cannot dragonize the operable character 80*a*. Meanwhile, when the gauge value reaches the necessary gauge value, it becomes possible for the player to dragonize the operable character 80*a*. In this embodiment, a battle game of battle royale starts in the state where the gauge value of the dragonization gauge 76 has become the necessary gauge value. This serves to reduce the risk that the player cannot perform dragonization at all during a battle game of battle royale, which compromises the fun of the game. Alternatively, a battle game of battle royale may be started from the state where the gauge value of the dragonization gauge 76 is zero, i.e., in the state where the dragonization gauge 76 is grayed out, and the gauge value may be increased by a certain amount for all the players as time elapses.

Note that in this embodiment, the dragon into which dragonization is performed is common among all the players. Note that the dragon into which transformation is performed is determined by a lottery for each battle game of battle royale. However, instead of performing a lottery, the dragon into which dragonization is performed may be determined in advance. Alternatively, a plurality of dragons may be defined for dragonization for each battle game of battle royale, and the dragon into which dragonization is actually performed may be determined from among the plurality of dragons for each player at the time of dragonization by that player.

Furthermore, in this embodiment, common statuses are set as the dragon statuses for all the players irrespective of the currently selected weapon type. Note, however, that the parameter of the attacking ability of the dragon changes depending on the weapon level of the operable character 80*a*. Therefore, the parameter of the attacking ability of the dragon becomes higher as the weapon level of the operable character 80*a* becomes higher. Alternatively, instead of reflecting the weapon level of the operable character 80*a* on the dragon parameters, the dragon parameters may be completely the same among all the players irrespective of the weapon levels of the individual players.

Figure 13A:
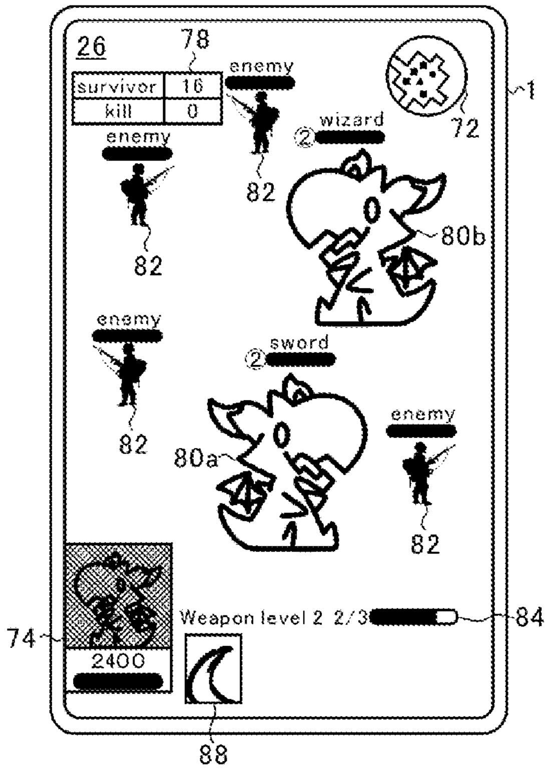
FIG. 13A is an illustration for explaining an example battle game screen in the case where dragonization has been performed.
Figure 13B:
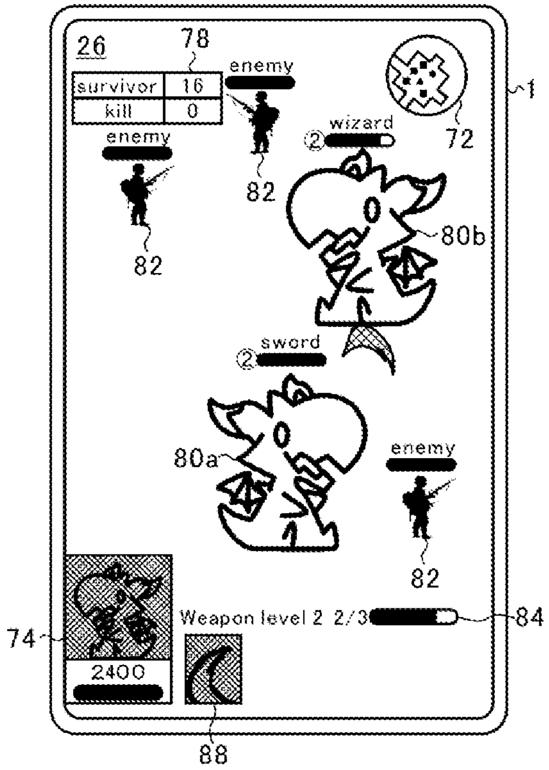
FIG. 13B is an illustration for explaining an example battle game screen in the case where dragonization has been performed and a skill has been invoked.

FIG. 13A is an illustration for explaining an example battle game screen in the case where dragonization has been performed. FIG. 13B is an illustration for explaining an example battle game screen in the case where dragonization has been performed and a skill has been invoked. As shown in FIG. 13A, when dragonization is performed, the operable character 80*a* is transformed into a dragon. When dragonization has been performed, in a lower part of the battle screen, a dragon skill gauge 88 indicating whether or not a skill for a dragon (hereinafter referred to as a dragon skill) is available is displayed instead of the skill gauges 86*a*, 86*b*, 86*c*, and 86*d*. The dragon skill is a skill that is set in advance for each dragon type and that is available only in the dragonized state. In this embodiment, when dragonization has been performed, the dragon skill gauge 88 is displayed in a state where the dragon skill is available. Furthermore, as shown in FIG. 13B, when the dragon skill is used, the dragon skill gauge 88 is grayed out, which indicates that the dragon skill has already been used.

Furthermore, when dragonization has been performed, the maximum value of the HPs of the operable character 80*a* is set to the HPs of the dragon, irrespective of the remaining HPs of the operable character 80*a*. Specifically, if the maximum value of the HP of the operable character 80*a* is 2400, the HPs of the dragon are set to 2400 either in the case where the remaining HPs of the operable character 80*a* are 2200 or in the case where the remaining HPs of the operable character 80*a* are 2400. Then, the HPs of the dragon decrease as time elapses and when the dragon is damaged. When the HPs of the dragon become zero, the dragon is transformed back into the operable character 80*a*.

Figure 14A:
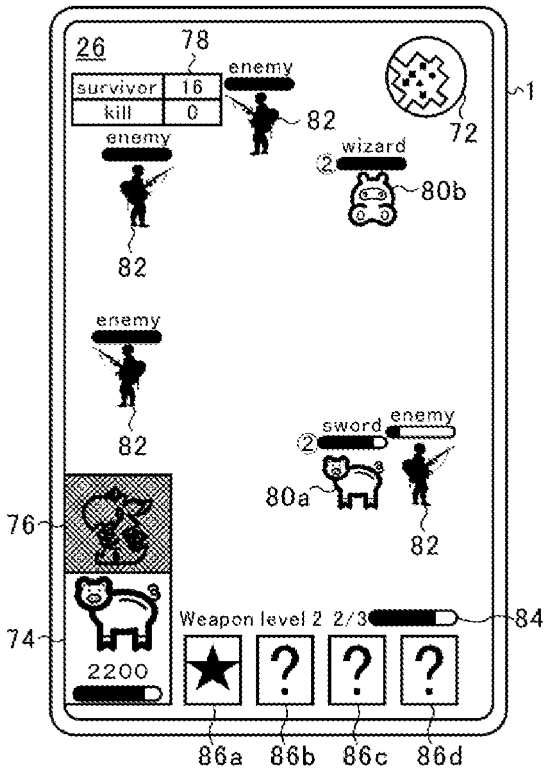
FIG. 14A is an illustration showing an example battle game screen in a state where a skill is available.
Figure 14B:
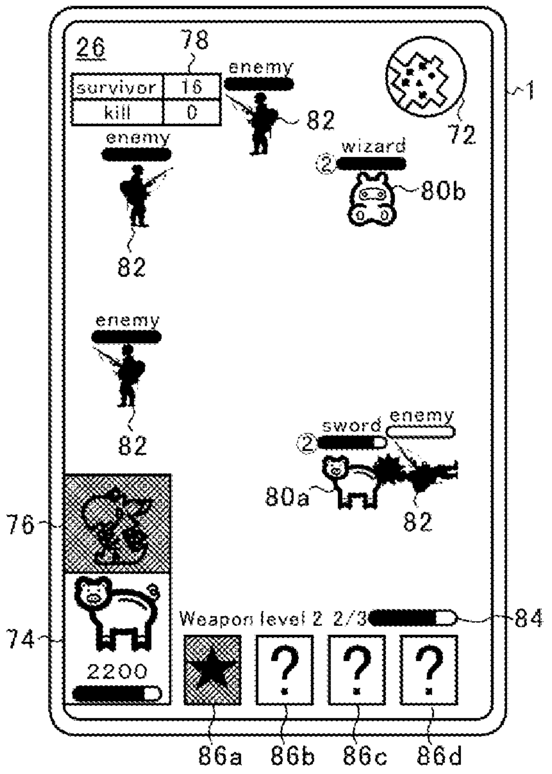
FIG. 14B is an illustration showing an example battle game screen in the case where a skill has been invoked.
Figure 14C:
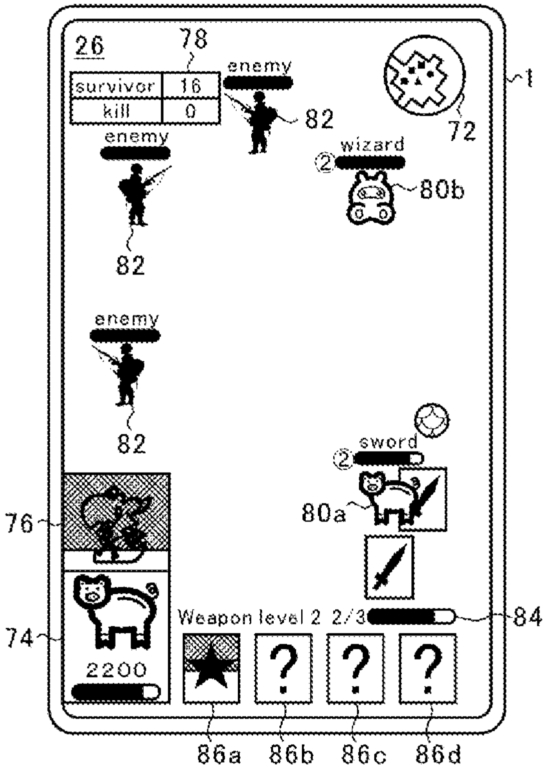
FIG. 14C is an illustration showing an example battle game screen in the case where an item has been dropped.

FIG. 14A is an illustration showing an example battle game screen in a state where a skill is available. FIG. 14B is an illustration showing an example battle game screen in the case where a skill has been invoked. FIG. 14C is an illustration showing an example battle game screen in the case where an item has been dropped. As shown in FIG. 14A, the skill becomes available when the gauge value of the skill gauge 86*a* reaches the necessary gauge. Then, as shown in FIG. 14B, when the skill corresponding to the skill gauge 86*a* has been used, the skill gauge 86*a* is grayed out, which indicates that the skill corresponding to the skill gauge 86*a* has been used.

Furthermore, when an enemy character 82 has been defeated, there are cases where an item is dropped from the defeated enemy character 82, as shown in FIG. 14C. As will be described later, the content of the item that is dropped is determined partially or entirely by a lottery. At this time, a prescribed item that is set in advance may always be dropped.

Furthermore, when the other-player character 80*b* or an NPC has been defeated, all the weapon enhancing items and unused skill items acquired by the defeated other-player character 80*b* or NPC are dropped. Furthermore, a prescribed item that is set in advance may always be dropped.

Figure 15A:
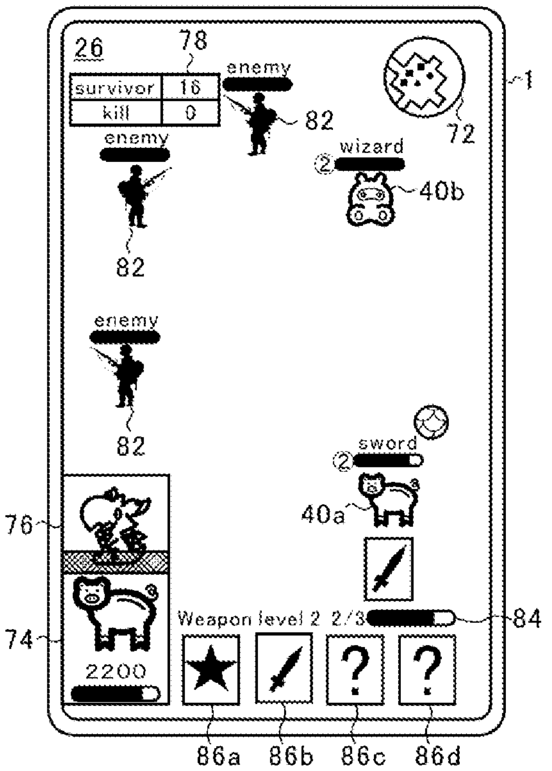
FIG. 15A is an illustration for explaining an example battle game screen in the case where a skill item has been acquired.
Figure 15B:
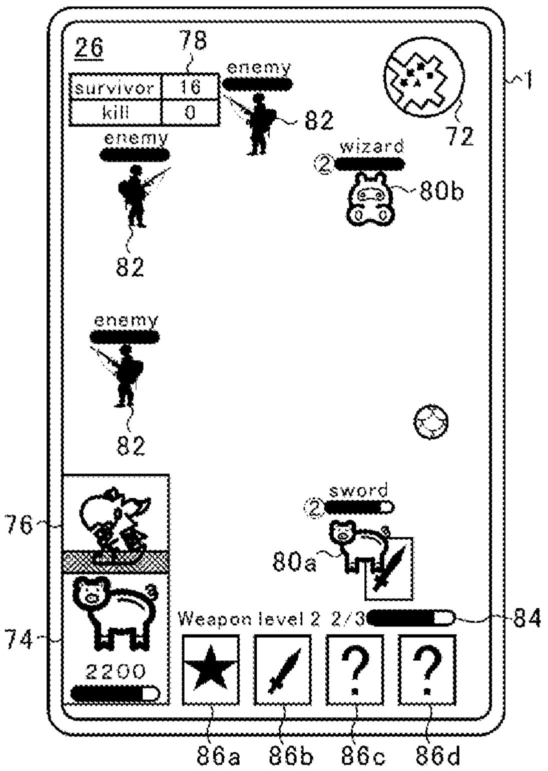
FIG. 15B is an illustration for explaining an example battle game screen at the time of acquiring a skill item.
Figure 15C:
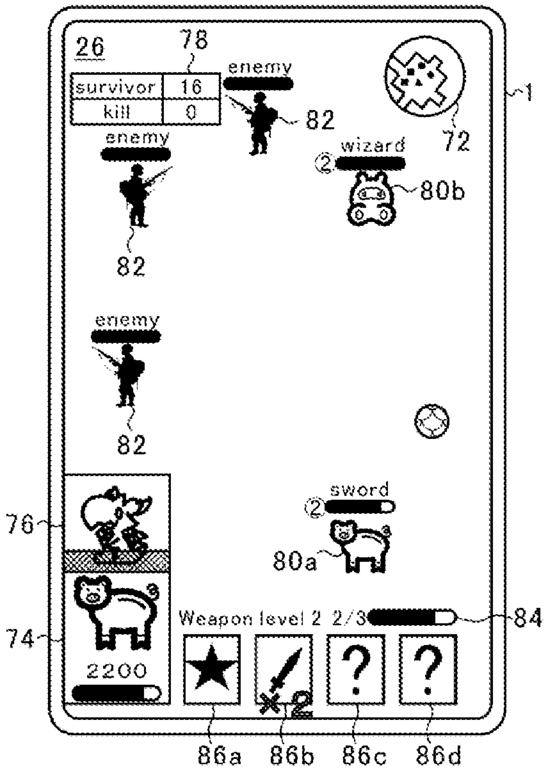
FIG. 15C is an illustration for explaining an example battle game screen in the case where a skill item has been stocked.
Figure 15D:
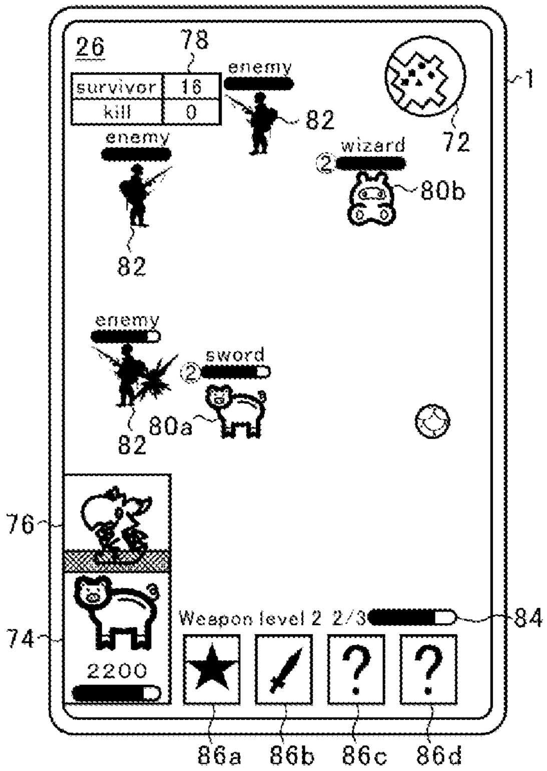
FIG. 15D is an illustration for explaining an example battle game screen in the case where a skill has been invoked.

FIG. 15A is an illustration for explaining an example battle game screen in the case where a skill item has been acquired. FIG. 15B is an illustration for explaining an example battle game screen at the time of acquiring a skill item. FIG. 15C is an illustration for explaining an example battle game screen in the case where a skill item has been stocked. FIG. 15D is an illustration for explaining an example battle game screen in the case where a skill has been invoked. As shown in FIG. 15A, when a skill item has been acquired, the skill corresponding to the acquired skill item is acquired in a vacant slot among the skill gauges 86*b*, 86*c*, and 86*d*. At this time, the indication of the skill gauge 86*b* is changed from "?" to an indication corresponding to the acquired skill, which notifies the player that the skill has become available.

Furthermore, in this embodiment, it is possible to acquire at most three kinds of skill items in total, and it is possible to stock at most two skill items of the same kind. In the case where a skill item of the same kind has been further acquired, as shown in FIG. 15B, "x2" is displayed under the corresponding skill gauge 86*b*, as shown in FIG. 15C, which notifies the player that two skills of the same kind have been stocked.

When the skill is invoked in the state where two skills of the same kind are stocked, the indication "x2" is deleted, as shown in FIG. 15D, which notifies the player that one skill has been used. Furthermore, when the skill is further used in this state, the indication of the skill gauge 86*a* is changed to "?", which notifies the player that all the skills displayed in the skill gauge 86*a* have been used.

Furthermore, in this embodiment, it is not possible to further acquire a skill item of the same kind in the state where two skills of the same kind are already stocked. However, the number of skills that can be stocked may be set to an arbitrary value in advance. Alternatively, the number of skills that can be stocked may be varied depending on the type of skill items.

Furthermore, in this embodiment, in the case where three kinds of skills have already been acquired and thus there is no vacancy in the skill gauges 86*b*, 86*c*, and 86*d*, it is not possible to newly acquire a skill item of another kind.

Furthermore, in this embodiment, even while the operable character 80*a* is dragonized, it is possible to acquire various kinds of items, such as skill items, weapon enhancing items, and recovery items. However, even if a skill item is acquired while the operable character 80*a* is dragonized, it is not possible to invoke the acquired skill item while the operable character 80*a* is dragonized.

Furthermore, in this embodiment, even when a recovery item is acquired while the operable character 80*a* is dragonized, the HPs of the dragon are not recovered, and the HPs of the operable character 80*a* immediately before dragonization are recovered. That is, considering that there is a big difference in the attacking ability before and after dragonization, the risk of meaninglessly elongating the period of dragonization and thereby compromising the fun of the game is reduced.

Meanwhile, in this embodiment, in the case where a weapon enhancing item is acquired and the weapon level is increased while the operable character 80*a* is dragonized, the parameter of the attacking ability of the dragon immediately increases in accordance with the weapon level. This makes it possible for the player to advantageously proceed with a battle game, which increases strategic possibilities for the player, serving to improve the fun of the game.

Figure 16A:
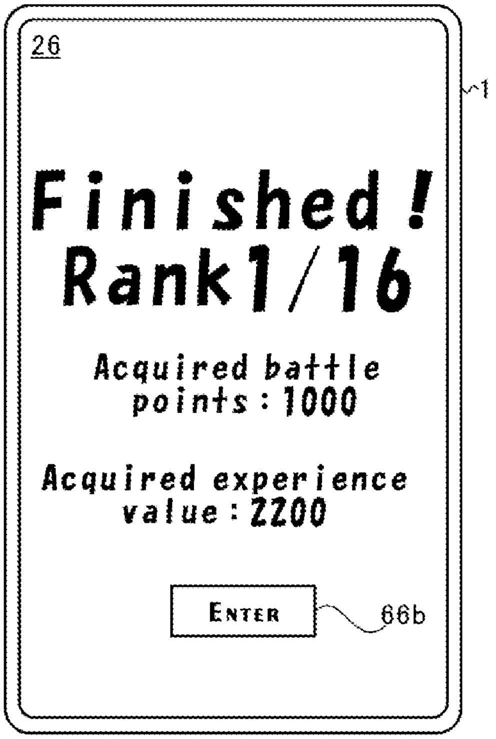
FIG. 16A is an illustration for explaining an example result report screen.
Figure 16B:
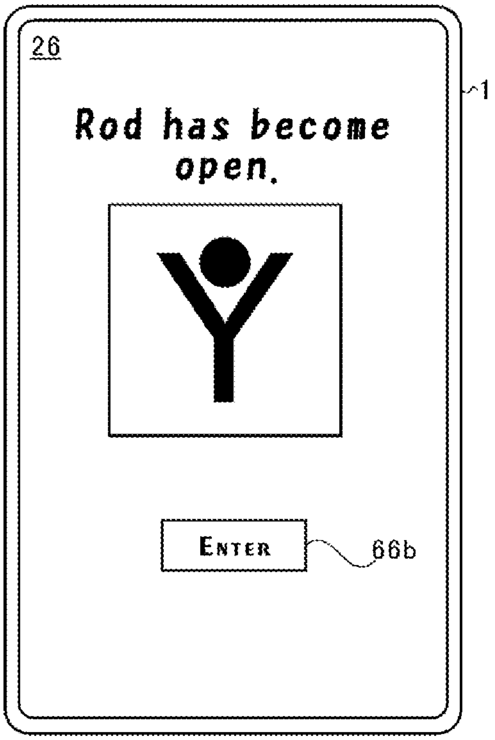
FIG. 16B is an illustration for explaining an example opening screen.

FIG. 16A is an illustration for explaining an example result report screen. FIG. 16B is an illustration for explaining an example opening screen. In a battle game of battle royale, the battle game of the battle royale comes to an end in the case where the HPs of the operable character 80*a* have become zero, which results in a defeat, or in the case where all the characters other than the operable character 80*a* (the other-player character 80*b* and the NPCs) have been defeated.

When the battle game of the battle royale comes to an end, a result report screen is displayed, as shown in FIG. 16A. The result report screen reports the rank of the operable character 80*a*, as well as the assignment of battle points and an experience value in accordance with the battle records, etc. in the battle game of the battle royale. In this embodiment, ranks are determined in the order of being defeated such that the player defeated first in the battle game of the battle royale is ranked sixteenth and such that the player not defeated till the end in the battle game of the battle royale is ranked first.

In the result report screen, an enter button 66*b* is displayed. When the enter button 66*b* in the result report screen is tapped, a screen transition occurs from the result report screen shown in FIG. 16A to the battle-royale selection screen shown in FIG. 7A.

Note, however, that in the case where the acquired experience value has reached a predefined certain value or in the case where a prescribed mission set in the battle game of the battle royale has been accomplished, when the enter button 66*b* in the result report screen is tapped, a screen transition to the opening screen shown in FIG. 16B occurs. As shown in the figure, in the opening screen, the player is notified of a weapon type that has newly become available.

Furthermore, an enter button 66*b* is displayed in the opening screen. When the enter button 66*b* in the opening screen is tapped, a screen transition from the opening screen shown in FIG. 16B to the battle-royale selection screen shown in FIG. 7A occurs.

The following describes in detail the functional configuration (functional units) of the information processing system S for executing the above-described specific games (quests) and prescribed games (battle royales), as well as processes mainly concerning the prescribed games (battle royales) among processes that are carried out by the individual functional units.

(Functional Configuration of Player Terminal 1)

Figure 17:
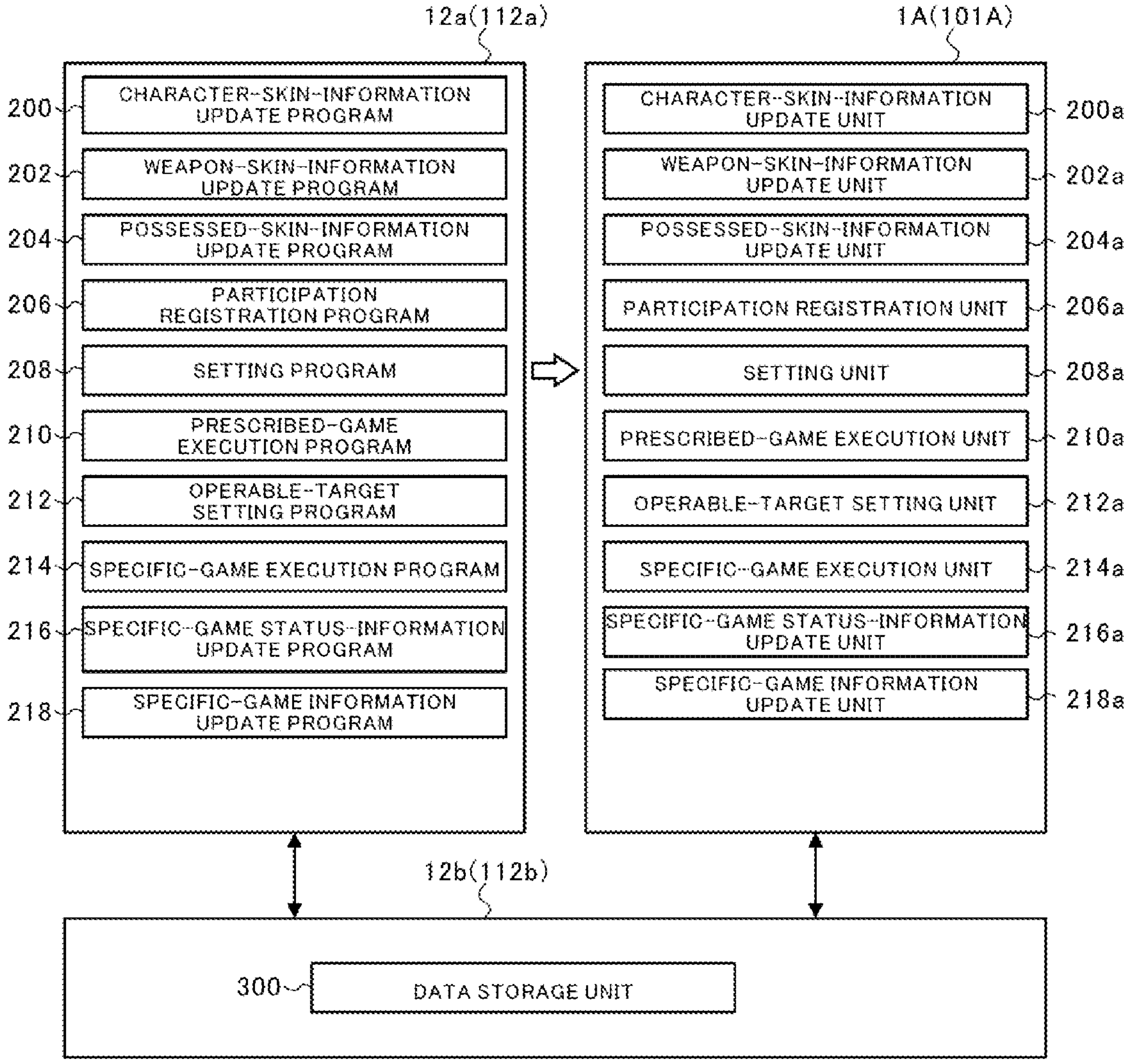
FIG. 17 is a diagram for explaining the functional configurations of the player terminal and the server.

FIG. 17 is a diagram for explaining the configurations of the player terminal 1 and the memory 112 in the server 100, as well as the functions thereof as computers. Here, programs and a storage unit are provided commonly in the player terminal 1 and the server 100, and it is assumed that when information is updated at the player terminal 1, information is similarly updated at the server 100, and that when information is updated at the server 100, information is similarly updated at the player terminal 1. Note, however, that the programs and storage unit described below may be provided in the player terminal 1 alone or in the server 100 alone.

In the memory 12 of the player terminal 1, a program storage area 12*a* and a data storage area 12*b* are provided. At the start of a game, the CPU 10 stores various kinds of programs (modules) in the program storage area 12*a*. Similarly, in the memory 112 of the server 100, a program storage area 112*a* and a data storage area 112*b* are provided. At the start of a game, the CPU 110 stores various kinds of programs (modules) in the program storage area 112*a*. Note that in this embodiment, in which the server 100 includes the management server 100A and the battle game server 100B, the following processes relating to the server 100 are executed mainly at the management server 100A of the server 100.

The programs that are stored in the program storage areas 12*a* and 112*a* include a character-skin-information update program 200, a weapon-skin-information update program 202, a possessed-skin-information update program 204, a participation registration program 206, a setting program 208, a prescribed-game execution program 210, an operable-target setting program 212, a specific-game execution program 214, a specific-game status-information update program 216, and a specific-game information update program 218. Note that the programs listed in FIG. 17 are examples, and the programs that are stored in the program storage areas 12*a* and 112*a* include a large number of other programs.

Furthermore, a data storage unit 300 that stores data is provided in the data storage areas 12*b* and 112*b*.

The CPU 10 runs the individual programs stored in the program storage area 12*a*, thereby updating the data in the data storage unit 300 of the data storage area 12*b*. Furthermore, the CPU 10 runs the individual programs stored in the program storage area 12*a*, thereby causing the player terminal 1 to function as a game control unit 1A.

Furthermore, the CPU 110 runs the individual programs stored in the program storage area 112*a*, thereby updating the data in the data storage unit 300 of the data storage area 112*b*. Furthermore, the CPU 110 runs the individual programs stored in the program storage area 112*a*, thereby causing the server 100 to function as a game control unit 101A.

The game control units 1A and 101A include a character-skin-information update unit 200*a*, a weapon-skin-information update unit 202*a*, a possessed-skin-information update unit 204*a*, a participation registration unit 206*a*, a setting unit 208*a*, a prescribed-game execution unit 210*a*, an operable-target setting unit 212*a*, a specific-game execution unit 214*a*, a specific-game status-information update unit 216*a*, and a specific-game information update unit 218*a*.

Specifically, the CPUs 10 and 110 run the character-skin-information update program 200, thereby causing the computer to function as the character-skin-information update unit 200*a*. Similarly, the CPUs 10 and 110 run the weapon-skin-information update program 202, the possessed-skin-information update program 204, the participation registration program 206, the setting program 208, the prescribed-game execution program 210, the operable-target setting program 212, the specific-game execution program 214, the specific-game status-information update program 216, and the specific-game information update program 218, thereby causing the computer to function as the weapon-skin-information update unit 202*a*, the possessed-skin-information update unit 204*a*, the participation registration unit 206*a*, the setting unit 208*a*, the prescribed-game execution unit 210*a*, the operable-target setting unit 212*a*, the specific-game execution unit 214*a*, the specific-game status-information update unit 216*a*, and the specific-game information update unit 218*a*.

Note that, as described earlier, in specific games (quests), the player can own characters acquired by lotteries, called gacha, as well as characters distributed from the administrator side. In the case where a character has been acquired by what is called gacha or in the case where a character has been distributed from the administrator side (in the case where a specific usage condition is satisfied), the specific-game information update unit (management unit) 218*a* stores the character in the data storage unit 300 as an owned character in a specific game (specific-game object).

Furthermore, as described earlier, in specific games (quests), the player can raise owned characters (specific-game objects), and can enhance various kinds of parameters by increasing the levels of owned characters. In the case where an owned character has been raised and the level of the owned character has been increased (in the case where a specific condition is satisfied), the specific-game status-information update unit (changing unit) 216*a* changes various kinds of parameters and stores the results in the data storage unit 300.

Then, the specific-game execution unit 214*a* executes the specific game with reference to the status of the owned character (specific-game object), changed by the specific-game status-information update unit (changing unit) 216*a*.

FIG. 18A is a figure for explaining a weapon-type status table. The weapon-type status table is a table that is commonly referred to by all the players participating in a battle game of battle royale. In the weapon-type status table, various kinds of statuses for each of the weapon types are set. Here, for each of the weapon types, the statuses concerning the attacking ability, the HPs, the burst, the moving speed, the attacking speed, the range, the skill accumulation time, and the kind of skill are stored. Note that the various kinds of statuses listed in FIG. 18A are examples, and the various kinds of statuses for each of the weapon types include various kinds of information other than those listed in FIG. 18A.

Note that the burst refers to the attacking ability for what is called a charged attack. With a charged attack, it is possible to give greater damage to an enemy character or an enemy player compared with a normal attack. Furthermore, the moving speed refers to the speed of movement of the operable character 80*a* in the game field during a battle game of battle royale. Furthermore, the attacking speed refers to the time that is taken before it becomes possible to execute the next attack after the operable character 80*a* performs an attack during a battle game of battle royale. Furthermore, the range refers to the distance within which an attack by the operable character 80*a* reaches. Furthermore, the skill accumulation period refers to the maximum time that is taken before a weapon skill becomes available.

As shown in the weapon-type status table, the statuses of the individual weapon types are set so as to include both strengths and weaknesses. In this embodiment, by allowing the player to select a preferred weapon type, strategic possibilities for the player are increased, which makes it possible to enhance the fun of the game.

FIG. 18B is a figure for explaining a dragon status table. The dragon status table is a table that is commonly referred to by all the players participating in a battle game of battle royale. In the dragon status table, various kinds of statuses for each of the dragon types are set. Here, for each of the dragon types, the statuses concerning the attacking ability, the moving speed, the attacking speed, and the range are stored. Note that the various kinds of statues shown in FIG. 18B are examples, and the various kinds of statuses of dragons include various kinds of information other than those listed in FIG. 18B. Alternatively, statuses that are specific to a common dragon may be set irrespective of the type of dragon.

FIG. 18C is a figure for explaining a weapon point table. The weapon point table is a table that is referred to commonly by all the players participating in a battle royale. In the weapon point table, the weapon points required in order to increase a weapon level are set. Specifically, when the total acquired weapon points are 0 points, 1 point, 4 points, 9 points, and 19 points, the weapon level becomes level 1, level 2, level 3, level 4, and level 5, respectively. In other words, 1 weapon point is required in order to advance from weapon level 1 to weapon level 2, 3 weapon points are required in order to advance from weapon level 2 to weapon level 3, 5 weapon points are required in order to advance from weapon level 3 to weapon level 4, and 10 weapon points are required in order to advance from weapon level 4 to weapon level 5.

FIG. 18D is a figure for explaining a weapon level table. The weapon level table is a table that is commonly referred to by all the players participating in a battle royale. In the weapon level table, the rate of increasing the attacking ability is set for each of the weapon levels. Specifically, settings are made such that in the case of weapon level 2, the attacking ability is increased by 10% compared with the case of weapon level 1, in the case of weapon level 3, the attacking ability is increased by 15% compared with the case of weapon level 1, in the case of weapon level 4, the attacking ability is increased by 20% compared with the case of weapon level 1, and in the case of weapon level 5, the attacking ability is increased by 30% compared with the case of weapon level 1. In the case where the operable character 80*a* is attacked by an enemy character 82 or an NPC, the amount of damage is calculated on the basis of the weapon level of the enemy character 82 or the NPC with reference to the above-described weapon-type status table and weapon table.

Figure 19:
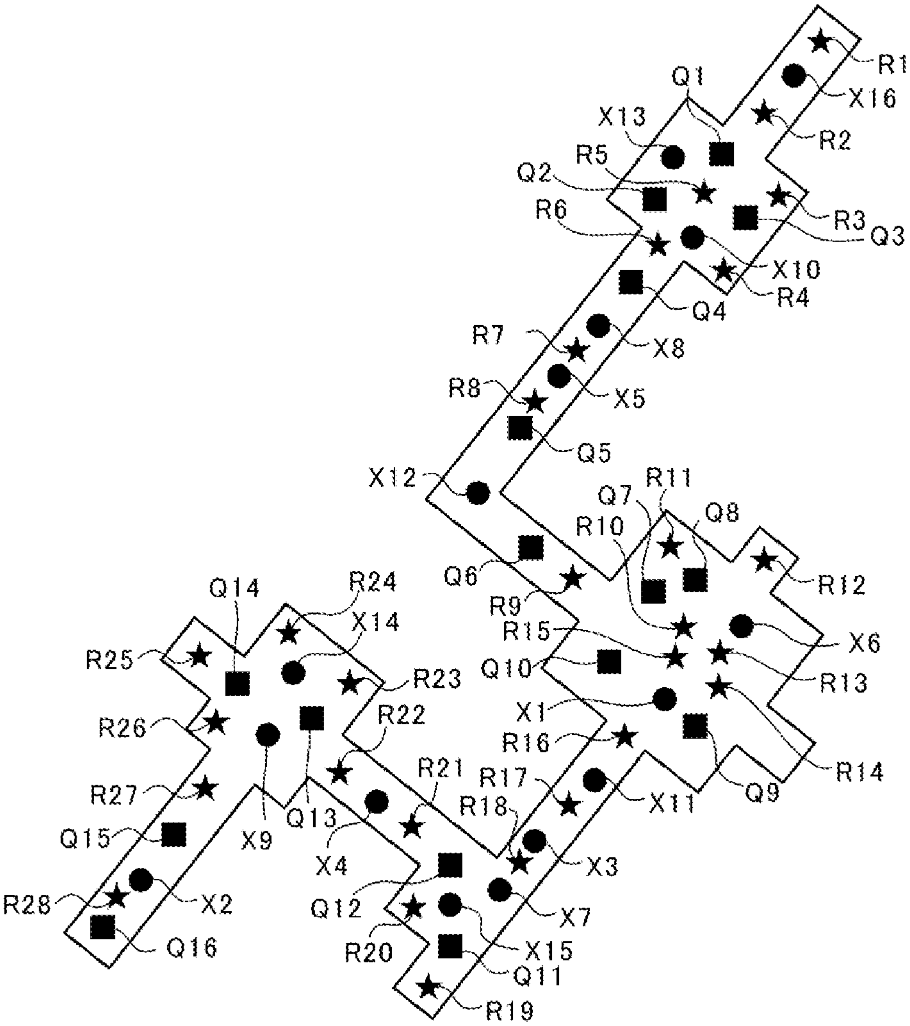
FIG. 19 is an illustration for explaining an example game field pattern 1 in a battle royale.

FIG. 19 is a figure for explaining an example game field pattern 1 for a battle royale. In this embodiment, a plurality of game fields, specifically, eight kinds of game fields, namely, pattern 1 to pattern 8, are provided for battle royales. Furthermore, one of the game fields is determined by a lottery. Here, an example game field of pattern 1 is shown.

Figure 20A:
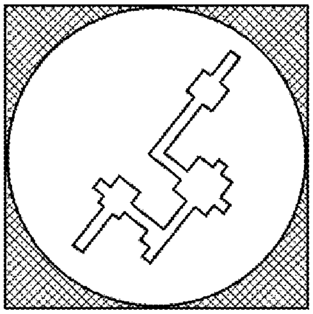
FIGS. 20A, 20B, and 20C are illustrations for explaining an example miasma-range change pattern 1.
Figure 20B:
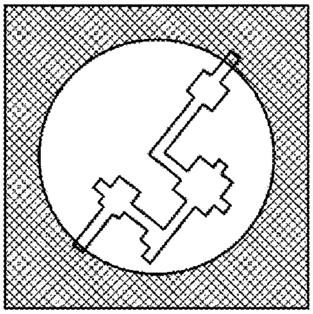
Figure 20C:
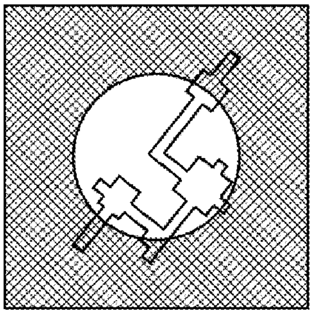
Figure 20D:
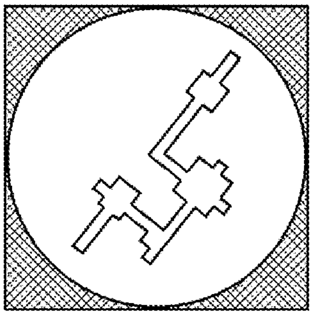
FIGS. 20D, 20E, and 20F are illustrations for explaining an example miasma-range change pattern 2.
Figure 20E:
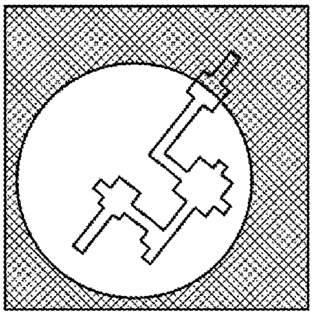
Figure 20F:
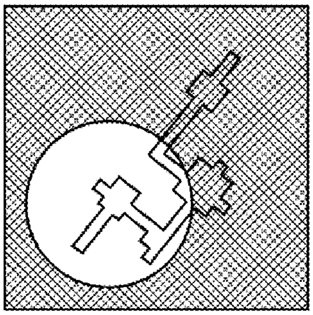
Figure 20G:
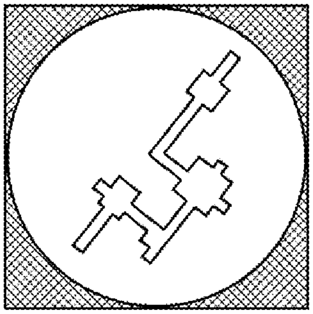
FIGS. 20G, 20H, and 20I are illustrations for explaining an example miasma-range change pattern 3.
Figure 20H:
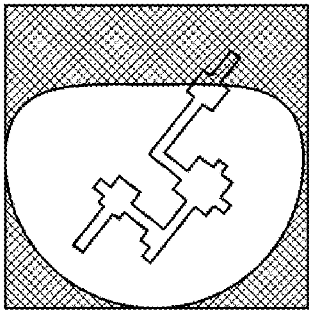
Figure 20I:
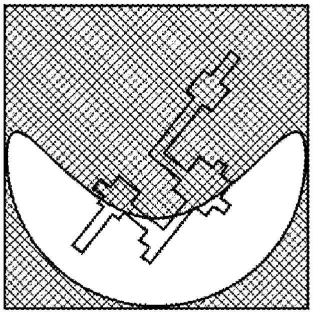

FIGS. 20A, 20B, and 20C are illustrations for explaining an example miasma-range change pattern 1. FIGS. 20D, 20E, and 20F are illustrations for explaining an example miasma-range change pattern 2. FIGS. 20G, 20H, and 20I are illustrations for explaining an example miasma-range change pattern 3. In this embodiment, a plurality of miasma-range change patterns, specifically eight patterns, namely, pattern 1 to pattern 8, are provided. Furthermore, one of the miasma-range change pattern is determined by a lottery.

Specifically, in change pattern 1, as shown in FIGS. 20A to 20C, settings are made such that the miasma range gradually becomes larger as the time elapses, whereby the substantial effective action range gradually becomes concentrically narrower.

Furthermore, in change pattern 2, as shown in FIGS. 20D to 20F, settings are made such that the miasma range gradually becomes larger as the time elapses, whereby the substantial effective action range gradually becomes narrower toward the lower left of the game field in the figure.

Furthermore, in change pattern 3, as shown in FIGS. 20G to 20I, settings are made such that the miasma range gradually becomes larger as the time elapses, whereby the substantial effective action range gradually becomes narrower toward the lower center of the game field in the figure.

In this embodiment, a battle game of battle royale is executed according to the combination of the game field pattern and the miasma-range change pattern individually determined by lotteries. However, for either the game field pattern or the miasma-range change pattern, or for both, instead of performing a lottery, a pattern that is set in advance may be determined.

In this embodiment, the initial positions of players (the operable character 80*a*, the other-player character 80*b*, and NPCs), the enemy characters 82, and various kinds of items are set for each combination of a game field pattern and a miasma-range change pattern.

Specifically, for example, in the case where the game field of pattern 1 and the miasma-range change pattern of pattern 1 are determined, X1 to X16 are set as the initial positions of players (the operable character 80*a*, the other-player character 80*b*, and NPCs), as shown in FIG. 19. Furthermore, Q1 to Q16 are set as the initial positions of the enemy characters 82. Furthermore, R1 to R28 are set as the initial positions of various kinds of items. Note that the number of initial positions of enemy characters 82 and the number of initial positions of various kinds of items may be the same among all the patterns, or may be varied for each combination of a game field pattern and a miasma-range change pattern.

In this embodiment, the initial position of each player is determined in association with a player number assigned to the player in a matching room, which will be described later. Furthermore, the content of various kinds of items that are disposed at R1 to R28 is determined by lotteries at the player terminal 1 of the host player at the start of a battle game of battle royale.

FIG. 21 is a figure showing an example matching-room status table. As shown in FIG. 21, the server 100 is provided with a plurality of matching rooms for performing matching concerning battle royales, and manages the statuses of the individual matching rooms. Each of the matching rooms has a room number assigned thereto.

In this embodiment, the following statuses are provided as the statuses of matching rooms: vacant, during matching, during count-down, and during battle game. The matching room status "vacant" indicates that there are no players in the matching room. The matching room status "during matching" indicates that less than eight players have entered the matching room and players who newly enter the room are being awaited. The matching room status "during count-down" indicates that eight or more players have entered the matching room and a count-down screen is displayed at the player terminals 1. As will be described later in detail, in the case of the matching room status "during count-down", there are cases where players are allowed to newly enter and cases where players are not allowed to newly enter. Furthermore, the matching room status "during battle game" indicates that a battle game of battle royale is being executed and players are not allowed to newly enter.

FIGS. 22A and 22B show example player management tables corresponding to individual matching rooms. The server 100 manages player management tables to manage players who have entered individual matching rooms. In a player management table, the player name, the player ID, and the room entry time of the player are stored so as to fill in the table from smaller player numbers in the order of room entry. Furthermore, an initial position (X1 to X16) of the player is assigned in advance to each player number.

Furthermore, player names are names that are commonly used in specific games (quests) and prescribed games (battle royales), and can be freely set by players. Note that it may be allowed to set player names that are specific to prescribed games (battle royales) separately from specific games (quests). In this case, the player names that are specific to prescribed games (battle royales) are registered in player management tables. Furthermore, player IDs are identification information that is assigned to each player and that is commonly used in specific games (quests) and prescribed games (battle royales).

In this embodiment, of the players registered in a player management table, the player with the oldest room entry time is considered as the host player. Furthermore, of the players registered in the player management table, the players other than the host player are considered as guest players. Note that in the case where the host player has exited the room before the start of a battle game of battle royale, the host player is changed to the player who entered the room earliest in the matching room.

In this embodiment, a maximum of 16 players are allowed to enter a matching room. Furthermore, in this embodiment, a battle game of battle royale is not executed until a minimum of eight players enter a room.

Furthermore, a count-down screen is displayed in the case where eight or more players have entered a matching room and 30 seconds has not elapsed since the room entry time of the player with the earliest room entry time (host player) in the matching room. At this time, the server 100 updates the matching room status from "during matching" to "during count-down". Furthermore, in the count-down screen, the time remaining before the elapse of 30 seconds from the room entry time of the host player is displayed. Therefore, in the example in FIG. 22A, the count-down screen is displayed at the player terminals 1 at the timing when the player with player number 8 enters the room and various kinds of information are stored in the player management table. Here, since the eighth player enters the room after seven seconds from the room entry time of the host player, the count-down starts from 23 seconds in the count-down screen.

Then, players who newly enter the room are accepted until the count-down reaches zero, and the entry of new players into the room is disabled when the count-down reaches zero. At this time, as shown in FIG. 22A, in the case where the total number of players who have entered the room when the count-down reaches zero is 16, a battle game of battle royale is started only with the players. The server 100 updates the matching room status to "during battle game" upon the start of the battle game, and updates the matching room status to "vacant" when the battle game comes to an end. Note that in the case where the total number of players who have entered the room reaches 16 before the elapse of 30 seconds since the room entry time of the host player, a battle game of battle royale is started immediately. In this case, the count-down screen is not displayed. Alternatively, in the case where the total number of players who have entered the room reaches 16 before the elapse of 30 seconds since the room entry time of the host player, the start of a battle game of battle royale may be awaited until the elapse of 30 seconds since the room entry time of the host player.

Meanwhile, as shown in FIG. 22B, in the case where the total number of players who have entered the room is less than 16 when the count-down reaches zero (when 30 seconds has elapsed since the room entry time of the host player), NPCs are added into the room such that the total number of players including the number of players who have entered the room becomes 16, and then a battle game of battle royale is started. Note that in this embodiment, prescribed player names that are set in advance are assigned as the player names of NPCs. Alternatively, the player names of NPCs may be determined at random.

Note that in the case where a player has exited the matching room in the matching room status "during matching", information concerning the player who has exited is deleted from the player management table. At this time, the server 100 slides the players registered in the player management table, thereby updating the player management table so as to fill the table from smaller player numbers in the order of entry of the players into the matching room.

Meanwhile, in the case where a player has exited the matching room in the matching room status "during count-down", information concerning the player who has exited is deleted from the player management table, and the player who has exited is replaced with an NPC. That is, in this case, the sliding described above is not performed. Therefore, in the case where a player exits after the matching room status becomes "during count-down", another player is not assigned to the player number with which the player has been registered. For example, as shown in FIG. 22A, in the case where the player with player number 10 has exited in the state where players are registered for all of the player numbers 1 to 16, another player is not allowed to newly enter the room.

Alternatively, when a player has exited the matching room in the case of the matching room status "during count-down", information concerning the player who has exited may be deleted from the player management table, and the players registered in the player management table may be slid. The player management table may be updated in this manner so as to fill the table from smaller player numbers in the order of entry of the players into the matching room. In this case, for example, as shown in FIG. 22A, in the case where the player with player number 10 has exited in the state where players are registered for all the player numbers 1 to 16, the players registered for player numbers 11 to 16 are slid to player numbers 10 to 15, which allows another player to newly enter the room.

Note that the numbers in the lottery tables described below represent input numbers and indicate the ratios of selection of the individual lottery results. FIG. 23A is a figure for explaining an example dragon-type lottery table. At the start of a battle game of battle royale, the server 100 determines the type of dragon to use in the battle royale with reference to the dragon-type lottery table. In the dragon-type lottery table, prescribed selection ratios are defined for each of the dragon types. Furthermore, the dragon determined by the lottery is determined as the dragon into which transformation occurs for all the players. Alternatively, instead of determining the dragon type by a lottery, a dragon that is set in advance may be selected.

FIG. 23B is a figure for explaining an example field content lottery table. At the start of a battle game of battle royale, the server 100 determines the type of game field in the battle royale with reference to the field content lottery table. In the field content lottery table, prescribed selection ratios are defined for each of the game field types. Furthermore, the battle game of the battle royale is executed in the game field determined by the lottery.

FIG. 23C is a figure for explaining an example miasma-range change-pattern content lottery table. At the start of a battle game of battle royale, the server 100 determines the type of miasma-range change pattern in the battle royale with reference to the miasma-range change-pattern content lottery table. In the miasma-range change-pattern content lottery table, prescribed selection ratios are defined for each of the types of the miasma-range change patterns. Furthermore, the battle game of battle royale is executed with the type of miasma-range change pattern determined by the lottery.

FIG. 23D is a figure for explaining an example initial-item content lottery table. At the start of a battle game of battle royale, with reference to the item content lottery table, lotteries are performed at the player terminal 1 of the host player to determine the content of various kinds of items that are disposed at individual positions. In the initial-item content lottery table, prescribed selection ratios are defined for each of the kinds of items. The various kinds of items having the content determined by the lotteries are disposed at the individual positions (28 points R1 to R28 in the case of FIG. 18), and the battle game of battle royale is executed.

That is, in this embodiment, 28 lotteries are executed with reference to the item content lottery table. Note that the initial-item content lottery table may include patterns in which items are not disposed. Furthermore, a plurality of patterns in which the content of various kinds of items that are disposed individually at R1 to R28 are all defined may be provided, in which case only one lottery is performed.

FIG. 23E is a figure showing an example dropped-item content lottery table. As described earlier, when an enemy character 82 is defeated during the execution of a battle game of battle royale, various kinds of items are dropped. The content of the various kinds of items that are dropped at this time is determined by a lottery with reference to the dropped-item content lottery table at the player terminal 1 of the player who has defeated the enemy character 82.

In the dropped-item content lottery table, prescribed selection ratios are defined for each of the kinds of items. Furthermore, various kinds of items having the content determined by the lottery are dropped. Note that in the case where a plurality of items are to be dropped, the lottery may be executed a plurality of times. Furthermore, the dropped-item content lottery table may include patterns with which items are not dropped. Note that in the case where an NPC has defeated an enemy character 82, the lottery is executed at the server 100. Alternatively, in the case where an NPC has defeated an enemy character 82, the lottery may be performed at the player terminal 1 of the host player or the player terminal 1 of a guest player.

Next, an example of processes by the information processing system S will be described. The following describes processes concerning a prescribed game (battle royale), while not describing processes concerning a specific game (quest).

(Processes by Information Processing System S)

Figure 24:
FIG. 24 is a sequence chart for explaining processes at the player terminal and the server, relating to a battle royale.

FIG. 24 is a sequence chart for explaining basic processes at the player terminal 1 and the server 100. When a log-in operation is input to the player terminal 1, log-in information is transmitted to the server 100 (P1). Upon receiving the log-in information, the server 100 sets various kinds of player information stored in association with the player ID (S1). Upon receiving the player information from the server 100, the player terminal 1 stores the player information (P2).

Furthermore, when a character-skin setting operation is executed at the player terminal 1, the character-skin-information update unit 200*a* updates various kinds of information in the data storage unit 300. When the information has been updated, character-skin update information is transmitted to the server 100 (P3). Upon receiving the character-skin update information, the server 100 updates information in the data storage unit 300, similarly to the player terminal 1.

Furthermore, when a weapon-skin setting operation is executed at the player terminal 1, the weapon-skin-information update unit 202*a* updates various kinds of information in the data storage unit 300. When the information has been updated, weapon-skin update information is transmitted to the server 100 (P4). Upon receiving the weapon-skin update information, the server 100 updates information in the data storage unit 300, similarly to the player terminal 1.

Furthermore, when a purchase operation is executed (a prescribed usage condition is satisfied) at the player terminal 1, the possessed-skin-information update unit (management unit) 204*a* updates information concerning character skins (prescribed-game objects) possessed by the player in the data storage unit 300. When the information has been updated, possessed-skin update information is transmitted to the server 100 (P5). Upon receiving the possessed-skin update information, the server 100 updates information in the data storage unit 300, similarly to the player terminal 1.

Furthermore, at the player terminal 1, when a battle selection operation in which the battle-selection operating part 52 is operated is executed in the battle-royale selection screen in FIG. 7A, a battle-royale pre-start process (P6) is executed.

Figure 25:
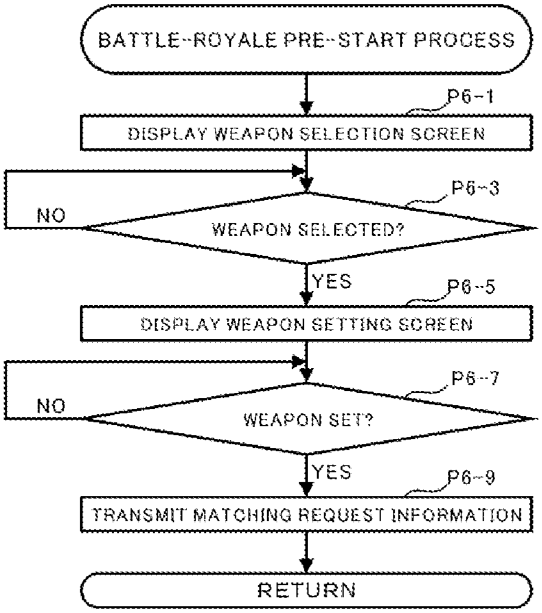
FIG. 25 is a flowchart for explaining a battle-royale pre-start process at the player terminal.

FIG. 25 is a flowchart for explaining the battle-royale pre-start process at the player terminal 1. In the battle-royale pre-start process, the participation registration unit 206*a* displays the weapon selection screen on the display 26 (P6-1). The participation registration unit 206*a* determines whether or not a weapon has been selected in the weapon selection screen (P6-3). In the case where a weapon has been selected in the weapon selection screen, the participation registration unit 206*a* displays a weapon setting screen corresponding to the selected weapon (P6-5). In the case where the random icon 70 is selected in the weapon selection screen, the participation registration unit 206*a* performs a lottery for a weapon, and displays a weapon setting screen corresponding to the weapon acquired through the lottery. Meanwhile, the participation registration unit 206*a* waits in the case where no weapon has been selected in the weapon selection screen.

The participation registration unit 206*a* determines whether or not a weapon has been set in the weapon setting screen, i.e., whether or not the enter button 66*b* in FIG. 8D has been tapped (P6-7). In the case where a weapon has been set in the weapon selection screen, the participation registration unit 206*a* transmits matching request information to the server 100 (P6-9). The matching request information includes information concerning the weapon type and character skin set in the weapon setting screen. Meanwhile, the participation registration unit 206*a* waits in the case where no weapon has been set in the weapon setting screen.

Referring back to FIG. 24, when the matching request information has been transmitted, the participation registration unit 206*a* of the player terminal 1 executes terminal-side matching processing (P7). In the terminal-side matching processing, a matching screen and a count-down screen are displayed on the display 26 of the player terminal 1. When count-down is finished in the count-down screen, the terminal-side matching processing is finished, and a terminal-side matching completion process (P8) is executed.

Furthermore, upon receiving the matching request information, the server 100 executes server-side matching processing (S5). Here, the participation registration unit 206*a* of the server 100 performs management of the entry/exit of players and NPCs into/from a matching room, management of the matching room status, and management of the player management table. Furthermore, the participation registration unit 206*a* of the server 100 also registers information concerning the weapon type and character skin selected by the player, included in the matching request information, in the player management table. That is, the character skins (game objects) individually selected by a plurality of players from among a plurality of types of character skins (game objects) are registered in association with the players as participating objects that serve as operable objects in a battle game of battle royale (prescribed game). Furthermore, the participation registration unit 206*a* of the server 100 sets the player with the earliest room entry time as the host player in the player management table.

Figure 26:
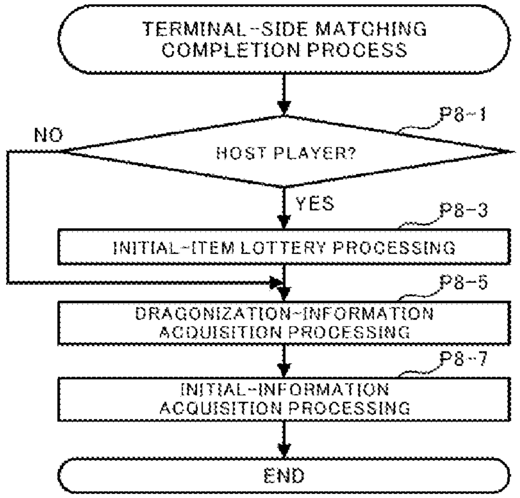
FIG. 26 is a flowchart for explaining a matching completion process at the server.

FIG. 26 is a flowchart for explaining the terminal-side matching completion process. In the subsequent processing, when information is transmitted from each player terminal 1 to the server 100, various kinds of information stored in the data storage unit 300 of the server 100 are updated, and each player terminal 1 acquires the various kinds of information stored in the data storage unit 300 of the server 100 and updates information stored in the data storage unit 300 of the player terminal 1.

The prescribed-game execution unit 210*a* of the player terminal 1 determines whether or not the player is set as the host player (P8-1). In the case where the player is set as the host player (YES in P8-1), the setting unit 208*a* determines the content of various kinds of items that are individually disposed at R1 to R28 with reference to the initial-item content lottery table shown in FIG. 23D (S8-3). Furthermore, initial item information indicating the content determined at this time is transmitted to the server 100.

Meanwhile, in the case where the player is not set as the host player (NO in P8-1), the process proceeds to step S8-5. The prescribed-game execution unit 210*a* acquires dragon-type information stored in the data storage unit 300 of the server 100 (S8-5). The dragon-type information includes information concerning the type of dragon into which dragonization is performed.

The prescribed-game execution unit 210*a* acquires initial information stored in the data storage unit 300 of the server 100, executes processing for acquiring initial information that is stored in the data storage unit 300 of the player terminal 1 (S8-7), and finishes the terminal-side matching completion process. The initial information includes the weapon-type status table shown in FIG. 18A, the dragon status table shown in FIG. 18B, the weapon point table shown in FIG. 18C, and the weapon level table shown in FIG. 18D. Furthermore, the initial information includes information concerning the kind of game field and the miasma-range change pattern in the battle game of battle royale. Furthermore, the initial information includes the positions where the individual players and enemy characters 82 are disposed, the positions where initial items are disposed, as well as information concerning the kinds thereof, in the game field of the battle game of battle royale.

Figure 27:
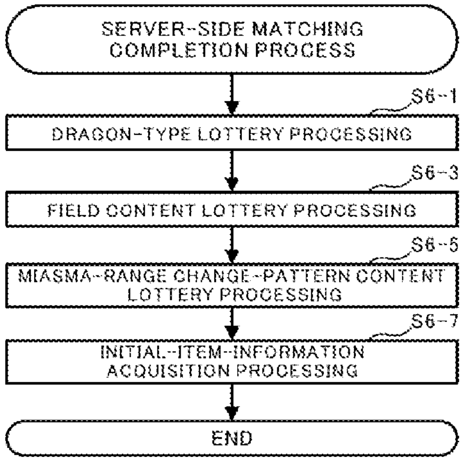
FIG. 27 is a flowchart for explaining a matching completion process at the player terminal.

Referring back to FIG. 24, upon the completion of the server-side matching processing in step S5 described above, a server-side matching completion process is executed (S6). FIG. 27 is a flowchart for explaining an example server-side matching completion process. The setting unit 208*a* of the server 100, with reference to the dragon-type lottery table shown in FIG. 23A, executes dragon-type lottery processing for determining the type of dragon into which dragonization is performed (S6-1). The lottery result is stored in the data storage unit 300 of the server 100 as dragon-type information. That is, the setting unit 208*a* sets a dragon (special object) for each prescribed game.

The setting unit 208*a* of the server 100, with reference to the field content lottery table stored in the data storage unit 300 of the server 100, shown in FIG. 23B, determines a game field in which the battle game of battle royale is executed (S6-3). The pattern of the determined game field is stored in the data storage unit 300 of the server 100.

The setting unit 208*a* of the server 100, with reference to the miasma-range change-pattern content lottery table stored in the data storage unit 300 of the server 100, shown in FIG. 23C, executes miasma-range change-pattern content lottery processing for determining the kind of miasma-range change pattern in the battle royale (S6-5). The determined miasma-range change pattern is stored in the data storage unit 300 of the server 100.

The setting unit 208*a* of the server 100 acquires initial item information indicating the content of initial items and dropped items, transmitted from the player terminal 1 of the host player, stores the initial item information in the data storage unit 300 of the server 100 (S6-7), and finishes the server-side matching completion process.

Figure 28:
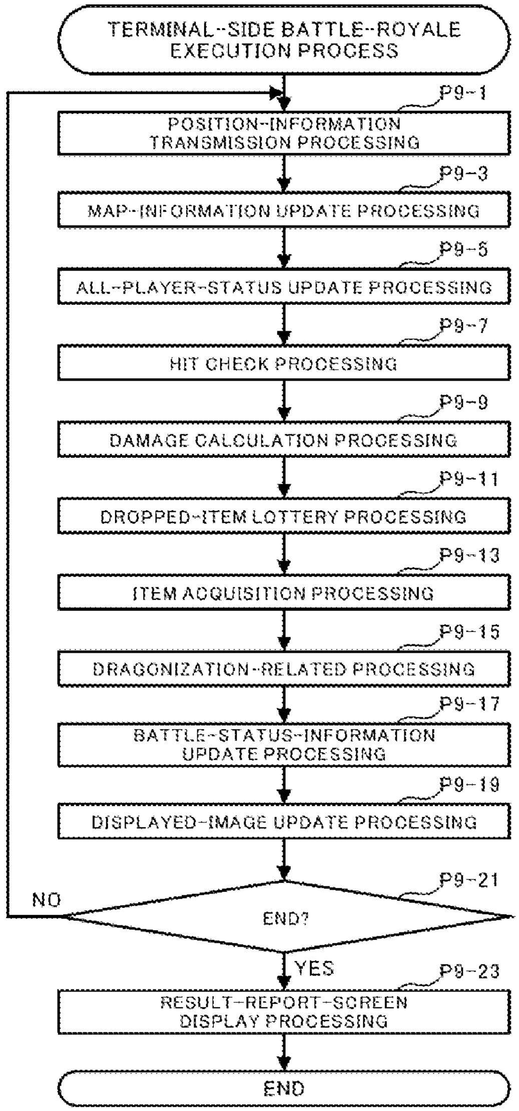
FIG. 28 is a flowchart for explaining a battle-royale execution process at the player terminal.

Referring back to FIG. 24, upon the completion of the terminal-side matching completion process (P8), a terminal-side battle-royale execution process (P9) is executed. FIG. 28 is a flowchart for explaining an example terminal-side battle-royale execution process. The prescribed-game execution unit 210*a* updates the position information of the operable character 80*a* and transmits the updated position information to the server 100 (P9-1).

The prescribed-game execution unit 210*a* acquires map information stored in the data storage unit 300 of the server 100, and updates map information stored in the data storage unit 300 of the player terminal 1 (P9-3). The map information includes information concerning the positions of individual players and enemy characters 82, as well as the positions of initial items and dropped items.

The prescribed-game execution unit 210*a* acquires all-player-status information stored in the data storage unit 300 of the server 100, and updates all-player-status information in the player terminal 1 (P9-5). The all-player-status information includes information concerning the statuses, weapon levels, owned skill items, whether or not dragonization has been performed, the gauge values of dragonization gauges, etc. of all the players participating in the battle game of battle royale.

The prescribed-game execution unit 210*a* executes hit check processing for determining whether or not the operable character 80*a* has been hit by an attack by an NPC, the other-player character 80*b*, or an enemy character 82 (P9-7). At this time, in the case where the NPC or the other-player character 80*b* that has performed the attack has been dragonized, the prescribed-game execution unit 210*a* executes the hit check processing with reference to the dragon status table. Meanwhile, in the case where the NPC or the other-player character 80*b* that has performed the attack has not been dragonized, the prescribed-game execution unit 210*a* executes the hit check processing with reference to the status corresponding to the weapon type in the weapon-type status table. In other words, it can be said that the prescribed-game execution unit 210*a* executes a prescribed game by using common status information that is common at least to participating objects (character skins) of the same type in the case where participating objects (character skins) are set as operable targets, while executing a prescribed game by using special status information that is common to one special object (dragon) in the case where special objects (dragons) are set as operable targets.

The prescribed-game execution unit 210*a* executes damage calculation processing for calculating the damage in the case where it is determined that the operable character 80*a* has been hit in the hit check processing in step P9-7 described above and subtracting the damage from the HPs of the operable character 80*a* (P9-9). At this time, the prescribed-game execution unit 210*a* executes damage calculation with reference to the initial information acquired in step S8-7 described above and the all-player-status information acquired in step P9-5 described above. Furthermore, at this time, in the case where the NPC or the other-player character 80*b* that has performed the attack has been dragonized, the prescribed-game execution unit 210*a* derives a dragon status corresponding to the weapon level and calculates the damage accordingly. Meanwhile, in the case where the NPC or the other-player character 80*b* that has performed the attack has not been dragonized, the prescribed-game execution unit 210*a* calculates the status of the NPC or the other-player character 80*b* corresponding to the weapon level and the weapon type and calculates the damage accordingly. In other words, it can be said that the prescribed-game execution unit 210*a* executes a prescribed game by using common status information that is common at least to participating objects (character skins) of the same type in the case where participating objects (character skins) are set as operable targets, while executing a prescribed game by using special status information that is common to one special object (dragon) in the case where special objects (dragons) are set as operable targets. Furthermore, the prescribed-game execution unit 210*a* transmits the HP information of the operable character 80*a* after the subtraction to the server 100. Furthermore, in the case where the HPs of the operable character 80*a* have become zero, which results in a defeat, the prescribed-game execution unit 210*a* transmits defeat information to the server 100. Note that the defeat information includes information concerning the player or enemy character 82 that has performed the attack. Note that in the case where it is not determined in the hit check processing that the operable character 80*a* has been attacked, the damage calculation processing is not executed.

In the case where the operable character 80*a* has defeated an enemy character 82, the prescribed-game execution unit 210*a*, with reference to the dropped-item content lottery table in FIG. 23E, executes dropped-item lottery processing for determining the content of items to be dropped by lotteries (P9-11). Then, the prescribed-game execution unit 210*a* transmits item information indicating the lottery results of the dropped-item lottery processing to the server 100. Note that the dropped-item lottery processing is not executed in the case where the operable character 80*a* has not defeated an enemy character 82.

The prescribed-game execution unit 210*a* executes item acquisition processing in the case where the operable character 80*a* has acquired various kinds of items in the game field (P9-13). Here, in the case where a skill item has been acquired, the prescribed-game execution unit 210*a* displays an indication corresponding to the acquired skill item in one of the skill gauges 86*b*, 86*c*, and 86*d*, and transmits the content of the acquired item to the server 100. Meanwhile, in the case where a recovery item has been acquired, the prescribed-game execution unit 210*a* recovers the HPs of the operable character 80*a* in accordance with the acquired recovery item, and transmits the HP information of the operable character 80*a* after the recovery to the server 100. Meanwhile, in the case where a weapon enhancing item has been acquired, the prescribed-game execution unit 210*a* updates the weapon points owned by the operable character 80*a* in accordance with the acquired weapon enhancing item, and transmits the weapon point information to the server 100. Furthermore, on the basis of the updated weapon points owned by the operable character 80*a*, the prescribed-game execution unit 210*a* manages the weapon level of the operable character 80*a* with reference to the weapon point table shown in FIG. 18C, and transmits weapon level information indicating the weapon level of the operable character 80*a* to the server 100.

The operable-target setting unit 212*a* executes dragonization-related processing for managing whether or not the operable character 80*a* has been dragonized (P9-15). That is, in the case where the player has performed a dragonization operation (in the case where a prescribed condition is satisfied), the operable-target setting unit 212*a* dragonizes the operable character 80*a* with reference to the dragon-type information acquired in step P8-5 described above, and sets the dragon as an operable target. Furthermore, as described earlier, the HPs of the dragon decreases as time elapses and in the case where the dragon is damaged. Furthermore, in the case where the HPs of the dragon have become zero (in the case where a termination condition is satisfied), the operable-target setting unit 212*a* changes the operable target from the dragon to the operable character 80*a*. Furthermore, the operable-target setting unit 212*a* transmits dragonization information indicating whether or not the operable character 80*a* has been dragonized to the server 100. That is, the operable-target setting unit 212*a* sets the character skins (participating objects) set by the individual players as operable targets, and changes the operable targets to dragons (special objects), irrespective of the types of the participating objects (character skins), for players for whom a prescribed condition is satisfied in a prescribed game. Furthermore, the operable-target setting unit 212*a* transmits dragonization gauge information indicating the gauge value of the dragonization gauge 76 to the server 100.

The player terminal 1 acquires battle status information stored in the data storage unit 300 of the server 100, and updates progress status information in the player terminal 1 (9-17). The progress status information includes information concerning the number of players defeated by each player, as well as the number of surviving players.

The player terminal 1 updates the game screen displayed on the display 26 on the basis of the items of information acquired or updated in P9-1 to P9-17 described above (P9-19).

The player terminal 1 determines whether or not the battle game of battle royale has been finished in the case where the HPs of the operable character 80*a* have become zero, which results in a defeat, or all the characters (the other-player character 80*b* and NPCs) other than the operable character 80*a* have been defeated (P9-21). The process proceeds to step P9-1 in the case where the battle game of battle royale has not been finished.

Meanwhile, in the case where the battle game of battle royale has been finished, the player terminal 1 displays a result report screen to report the rank of the operable character 80*a*, as well as a message that battle points and an experience value are assigned in accordance with the battle records, etc. in the battle game of battle royale (P9-23), and finishes the terminal-side battle-royale execution process.

Figure 29:
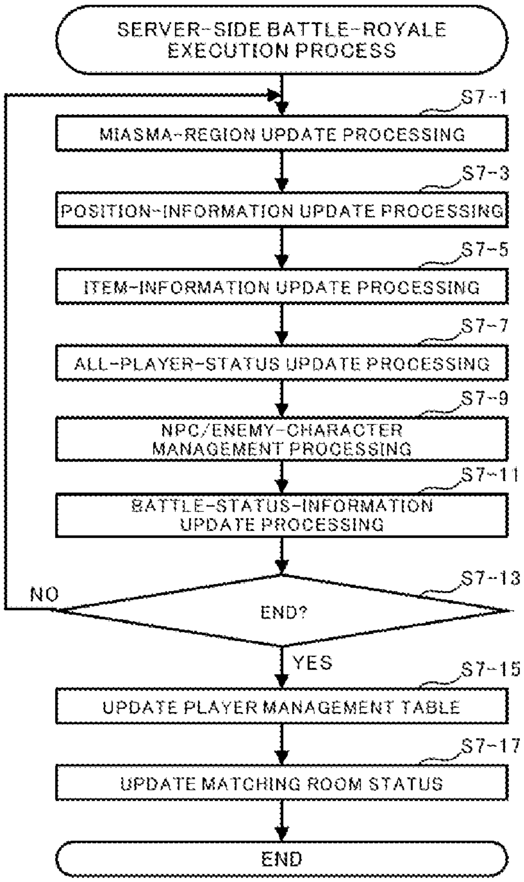
FIG. 29 is a flowchart for explaining a battle-royale execution process at the server.

Referring back to FIG. 24, upon the completion of the server-side matching completion process in step 6 described above, a server-side battle-royale execution process (S7) is executed. FIG. 29 is a flowchart for explaining an example server-side battle-royale execution process. The prescribed-game execution unit 210*a* of the server 100 changes the miasma region in the battle field according to the miasma-range change pattern determined in step S6-5 described above, and stores the result in the data storage unit 300 of the server 100 (S7-1).

The prescribed-game execution unit 210*a* of the server 100 acquires the position information of the operable character 80*a*, transmitted from the player terminal 1 of each player, and updates the position information of all the players, stored in the data storage unit 300 of the server 100 (S7-3).

In the case where item information has been transmitted from the player terminal 1 of each player, the prescribed-game execution unit 210*a* of the server 100 updates item information in the data storage unit 300 of the server 100 (S7-5).

The prescribed-game execution unit 210*a* of the server 100 updates all-player-status information stored in the data storage unit 300 of the server 100 on the basis of the HP information, weapon point information, weapon level information, dragonization information, and dragonization gauge information transmitted from the player terminal 1 of each player (S7-7).

The prescribed-game execution unit 210*a* of the server 100 executes enemy-character management processing for managing NPCs and enemy characters 82 in the battle game (S7-9).

The prescribed-game execution unit 210*a* of the server 100 updates the battle status information on the basis of the defeat information received from each player terminal 1 (S7-11).

The prescribed-game execution unit 210*a* of the server 100 determines whether or not the battle game of battle royale has been finished (S7-13). The process proceeds to step S7-1 in the case where the battle game of battle royale has not been finished (NO in S7-13).

In the case where the battle game of battle royale has been finished (YES in S7-13), the prescribed-game execution unit 210*a* of the server 100 deletes player information registered in the player management table and updates the player management table (S7-15).

The prescribed-game execution unit 210*a* of the server 100 updates the matching room status from "during battle game" to "vacant" (S7-17), and finishes the server-side battle-royale execution process.

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

In the embodiment described above, the sharing of processes that are executed at the player terminal 1 and the server 100 is merely an example. For example, it suffices for each of the processes described above to be executed by at least one of the player terminal 1 and the server 100, and there is no particular limitation as to the execution timing and executing device.

Furthermore, in the embodiment described above, the setting unit 208*a* of the server 100 executes dragon-type lottery processing for determining the type of dragon into which dragonization is performed, with reference to the dragon-type lottery table shown in FIG. 23A; however, the present invention is not limited thereto. For example, the setting unit 208*a* of the player terminal 1 of the host player may execute dragon-type lottery processing for determining the type of dragon into which dragonization is performed, with reference to the dragon-type lottery table. In this case, the lottery result of the dragon-type lottery processing at the player terminal 1 of the host player may be transmitted (distributed) to the player terminals 1 of the other players via the server 100.

Furthermore, the above-described embodiment has been described such that battle royales are executed as prescribed games and quests are executed as specific games. However, it suffices that specific games are different from prescribed games, and there is no particular limitation as to the content of specific games. Furthermore, instead of providing specific games, game machines dedicated for prescribed games may be adopted. Furthermore, although the above-described embodiment has been described in the context of the case of what is called solo-play (all the players other than the player himself or herself are enemies) of a battle game of battle royale, the present invention is not limited thereto. For example, it may be allowed to form a tag or a team in a battle game of battle royale. The formation of tags or teams in this case may be determined by lotteries at the player terminal 1 of the host player or the server 100, or a player may be allowed to designate arbitrary other players.

Furthermore, although the operable character 80*a* is operated on the basis of player's operation in a battle game of battle royale in the embodiment described above, a battle game of battle royale may be executed under computer control.

In the embodiment described above, the player can select a weapon type and a character skin corresponding to the weapon type in a battle royale, and the selected character skin 62 is used as a participating object in a prescribed game; however, the present invention is not limited thereto. That is, it suffices to execute a prescribed game by using common status information that is common to participating objects of the same type, and it may be allowed to directly select a character skin. Furthermore, the above-described embodiment has been described in the context of the case where the operable character 80*a* is transformed into a dragon in the case where a prescribed condition is satisfied; however, the present invention is not limited thereto. That is, it suffices to change operable targets to a special object having common special status information, irrespective of the types of participating objects, for players for whom a prescribed condition is satisfied during a prescribed game.

Furthermore, the content of initial items and the content of dropped items in the embodiment described above are merely examples. For example, as an initial item or a dropped item, an item with which the gauge value of the dragonization gauge is increased may be disposed or dropped.

Furthermore, the operable character 80*a* in the undragonized state may enter an invisible state (hidden state) from the other-player character 80*b* in a specific place (e.g., thick grass) in the game field of a battle game of battle royale, while becoming visible from the other-player character 80*b* in the state where the operable character 80*a* has been dragonized to become a dragon. At this time, even in the case where the operable character 80*a* is in the undragonized state in the specific place and is thus in the state invisible from the other-player character 80*b*, the operable character 80*a* may temporarily become partially or entirely visible from the other-player character 80*b* while the operable character 80*a* is performing an attacking action. Alternatively, even in the case where the operable character 80*a* is in the undragonized state in the specific place and is thus in the state invisible from the other-player character 80*b*, effect images for bullets, arrows, slashing, etc. resulting from attacks performed by the operable character 80*a* may be rendered visible.

Furthermore, the above-embodiment has been described in the context of the case where dragonization of the operable character 80*a* is possible in the case where a dragonization operation has been performed by the player; however, the present invention is not limited thereto. That is, it suffices for the timing of dragonization to be the case where a prescribed condition defined in advance is satisfied, and in addition to the case where a dragonization operation has been performed by the player, the case where the HPs of the operable character 80*a* have become zero in the state where the gauge value of the dragonization gauge 76 is the necessary gauge value may be considered as the case where a prescribed condition is satisfied. In this case, when the HPs of the operable character 80*a* become zero in the state where the gauge value of the dragonization gauge 76 is the necessary gauge value, the operable character 80*a* is automatically transformed into a dragon. At this time, when the HPs of the dragon become zero, whereby the dragon is transformed back into the operable character 80*a*, it may be allowed to continue the battle game of battle royale by setting the HPs of the operable character 80*a* to one or prescribed HPs set in advance, or when the HPs of the operable character 80*a* have become zero, the battle game of battle royale may directly result in a defeat.

Note that an information processing program for executing the processes in the embodiment described above may be stored in a computer-readable storage medium and may be provided in the form of the storage medium. Furthermore, a game terminal device including this storage medium may be provided. Alternatively, the embodiment described above may be embodied in the form of an information processing method for realizing the individual functions and the steps shown in the flowcharts.

A first aspect of the present disclosure includes a non-transitory computer-readable medium storing a program, the program causing a computer to execute:

- registering game objects in association with a plurality of players as participating objects that serve as operable targets in prescribed games, the game objects being selected by the individual players from among a plurality of types of game objects;
- setting special objects for each of the prescribed games;
- setting the participating objects as operable targets and changing the operable targets to the special objects, irrespective of the types of the participating objects, for players for whom a prescribed condition is satisfied in the prescribed game; and
- executing the prescribed game by using common status information that is common at least to the participating objects of the same type in the case where the participating objects are set as operable targets, and executing the prescribed game by using special status information that is common to one of the special objects in the case where the special objects are set as operable targets.

In the first aspect, the computer may be caused to execute:

- storing, as a prescribed-game object, the game object for which a prescribed usage condition for use by the player is satisfied in the prescribed game, and storing, as a specific-game object, the game object for which a specific usage condition that is different from the prescribed usage condition is satisfied in a specific game that is different from the prescribed game;
- changing the status of the specific-game object in the specific game in accordance with a specific condition; and
- executing the specific game with reference to the status of the specific-game object, changed in accordance with the specific condition,
- it may be possible to use a common image in the prescribed game and the specific game, and
- it may be possible to use a common image for the prescribed-game object and the specific-game object.

A second aspect of the present disclosure includes an information processing method that is executed by either a player terminal or a server that is communicative with the player terminal, or by both, the method including:

- registering game objects in association with a plurality of players as participating objects that serve as operable targets in prescribed games, the game objects being selected by the individual players from among a plurality of types of game objects;
- setting special objects for each of the prescribed games;
- setting the participating objects as operable targets and changing the operable targets to the special objects, irrespective of the types of the participating objects, for players for whom a prescribed condition is satisfied in the prescribed game; and
- executing the prescribed game by using common status information that is common at least to the participating objects of the same type in the case where the participating objects are set as operable targets, and executing the prescribed game by using special status information that is common to one of the special objects in the case where the special objects are set as operable targets.

The second aspect may include:

storing, as a prescribed-game object, the game object for which a prescribed usage condition for use by the player is satisfied in the prescribed game, and storing, as a specific-game object, the game object for which a specific usage condition that is different from the prescribed usage condition is satisfied in a specific game that is different from the prescribed game;

changing the status of the specific-game object in the specific game in accordance with a specific condition; and executing the specific game with reference to the status of the specific-game object, changed in accordance with the specific condition, it may be possible to use a common image in the prescribed game and the specific game, and it may be possible to use a common image for the prescribed-game object and the specific-game object.

A third aspect of the present disclosure includes an information processing system including a player terminal and a server that is communicative with the player terminal, wherein either the player terminal or the server or both the player terminal and the server are configured to execute:

registering game objects in association with a plurality of players as participating objects that serve as operable targets in prescribed games, the game objects being selected by the individual players from among a plurality of types of game objects;

setting special objects for each of the prescribed games;

setting the participating objects as operable targets and changing the operable targets to the special objects, irrespective of the types of the participating objects, for players for whom a prescribed condition is satisfied in the prescribed game; and executing the prescribed game by using common status information that is common at least to the participating objects of the same type in the case where the participating objects are set as operable targets, and executing the prescribed game by using special status information that is common to one of the special objects in the case where the special objects are set as operable targets.

In the third aspect, either the player terminal or the server or both the player terminal and the server may be configured to execute:

storing, as a prescribed-game object, the game object for which a prescribed usage condition for use by the player is satisfied in the prescribed game, and storing, as a specific-game object, the game object for which a specific usage condition that is different from the prescribed usage condition is satisfied in a specific game that is different from the prescribed game;

changing the status of the specific-game object in the specific game in accordance with a specific condition; and executing the specific game with reference to the status of the specific-game object, changed in accordance with the specific condition, it may be possible to use a common image in the prescribed game and the specific game, and it may be possible to use a common image for the prescribed-game object and the specific-game object.

What is claimed is:

1. A non-transitory computer-readable medium storing a program, the program causing a computer to perform a method comprising:

registering a first game object selected by a first player among a plurality of players, wherein the first game object is in association with the first player, wherein a respective player among the plurality of players selects a respective game object from a plurality of types of game objects comprising the first game object, and wherein the first game object is registered as a participating object serving as an operable target in a first game;

setting a special object for the first game;

controlling a parameter value of the first player;

setting the participating object as the operable target in the first game;

changing the operable target to the special object, irrespective of a type of the participating object in the first game, for the first player at least having the parameter value that is equal to or more than a threshold in the first game;

executing the first game by using common status information that is common at least to a plurality of participating objects of a same type in response to the first player using the participating object as an operable object; and executing the first game by using special status information set for the special object in response to the first player using the special object as the operable object, wherein each player among the plurality of players can individually change a respective operable target among a plurality of operable targets from a respective participating object among a plurality of participating objects to a respective special object among a plurality of special objects, and wherein the plurality of players can change the respective operable target from the respective participating object to the respective special object at a predetermined timing.

2. The non-transitory computer-readable medium according to claim 1, the program causing the computer to execute:

storing the first game object in response to the first game object satisfying a first usage condition for use by the first player in the first game;

storing the first game object as a second game object in response to the first game object satisfying a second usage condition that is different from the first usage condition in a second game that is different from the first game;

changing a status of the second game object in the second game in response to a specific condition being satisfied; and executing the second game with reference to the changed status of the second game object, wherein a common image is used in the first game and the second game, and wherein the common image is used for the first game object and the second game object.

3. An information processing method executed by at least one computer, the information processing method comprising:

registering a first game object selected by a first player among a plurality of players, wherein the first game object is in association with the first player, wherein a respective player among the plurality of players selects a respective game object from a plurality of types of game objects comprising the first game object, and wherein the first game object is registered as a participating object serving as an operable target in a first game;

setting a special object for the first game;

controlling a parameter value of the first player;

setting the participating object as the operable target in the first game;

changing the operable target to the special object, irrespective of a type of the participating object in the first game, for the first player at least having the parameter value that is equal to or more than a threshold in the first game;

executing the first game by using common status information that is common at least to a plurality of participating objects of a same type in response to the first player using the participating object as an operable object; and executing the first game by using special status information set for the special object in response to the first player using the special object as the operable object, wherein each player among the plurality of players can individually change a respective operable target among a plurality of operable targets from a respective participating object among a plurality of participating objects to a respective special object among a plurality of special objects, and wherein the plurality of players can change the respective operable target from the respective participating object to the respective special object at a predetermined timing.

4. The information processing method according to claim 3, the information processing method comprising:

storing the first game object in response to the first game object satisfying a first usage condition for use by the first player in the first game;

storing the first game object as a second game object in response to the first game object satisfying a second usage condition that is different from the first usage condition in a second game that is different from the first game;

changing a status of the second game object in the second game in response to a specific condition being satisfied; and executing the second game with reference to the changed status of the second game object, wherein a common image is used in the first game and the second game, and wherein the common image is used for the first game object and the second game object.

5. An information processing system comprising a player terminal and a server that is communicative with the player terminal, the player terminal or the server, or both of the player terminal and the server being configured to perform a method comprising:

registering a first game object selected by a first player among a plurality of players, wherein the first game object is in association with the first player, wherein a respective player among the plurality of players selects a respective game object from a plurality of types of game objects comprising the first game object, and wherein the first game object is registered as a participating object serving as an operable target in a first game;

setting a special object for the first game;

controlling a parameter value of the first player;

setting the participating object as the operable target in the first game;

changing the operable target to the special object, irrespective of a type of the participating object in the first game, for the first player at least having the parameter value that is equal to or more than a threshold in the first game;

executing the first game by using common status information that is common at least to a plurality of participating objects of a same type in response to the first player using the participating object as an operable object; and executing the first game by using special status information set for the special object in response to the first player using the special object as the operable object, wherein each player among the plurality of players can individually change a respective operable target among a plurality of operable targets from a respective participating object among a plurality of participating objects to a respective special object among a plurality of special objects, and wherein the plurality of players can change the respective operable target from the respective participating object to the respective special object at a predetermined timing.

6. The information processing system according to claim 5, wherein the method further comprises:

storing the first game object in response to the first game object satisfying a first usage condition for use by the first player in the first game;

storing the first game object as a second game object in response to the first game object satisfying a second usage condition that is different from the first usage condition in a second game that is different from the first game;

changing a status of the second game object in the second game in response to a specific condition being satisfied; and executing the second game with reference to the changed status of the second game object, wherein a common image is used in the first game and the second game, and wherein the common image is used for the first game object and the second game object.

* * * * *